United States Patent
Kim et al.

(10) Patent No.: US 12,244,959 B2
(45) Date of Patent: Mar. 4, 2025

(54) TELEVISION MONITOR WITH DUAL CONFIGURATION SUPPORT ASSEMBLY

(71) Applicant: Vizio, Inc., Irvine, CA (US)

(72) Inventors: Glen Gihong Kim, Anaheim, CA (US); Aung Khin Soe Win, Alhambra, CA (US)

(73) Assignee: Vizio, Inc., Irvine, CA (US)

( * ) Notice: Subject to any disclaimer, the term of this patent is extended or adjusted under 35 U.S.C. 154(b) by 472 days.

(21) Appl. No.: 17/578,870

(22) Filed: Jan. 19, 2022

(65) Prior Publication Data

US 2022/0232188 A1 Jul. 21, 2022

Related U.S. Application Data

(60) Provisional application No. 63/139,060, filed on Jan. 19, 2021.

(51) Int. Cl.
*H04N 5/655* (2006.01)
*F16M 11/00* (2006.01)
(Continued)

(52) U.S. Cl.
CPC ............ *H04N 5/655* (2013.01); *F16M 11/00* (2013.01); *F16M 11/04* (2013.01); *F16M 11/20* (2013.01);
(Continued)

(58) Field of Classification Search
CPC ........ F16M 11/00; F16M 11/04; F16M 11/08; F16M 11/20; H04N 5/64; H04N 5/655; H04N 5/645; H04N 5/642
(Continued)

(56) References Cited

U.S. PATENT DOCUMENTS

| 7,369,401 | B1 * | 5/2008 | Floersch ............ F16M 11/2085 |
| | | | 292/301 |
| 9,027,766 | B1 | 5/2015 | Serotta et al. |

(Continued)

FOREIGN PATENT DOCUMENTS

| GB | 2440597 A | * | 2/2008 | ............. F16M 11/04 |
| GB | 2450892 A | * | 1/2009 | ........... A47F 5/0846 |

(Continued)

OTHER PUBLICATIONS

English translation of KR1020170051977 from Total Patent One.

*Primary Examiner* — David N Werner
(74) *Attorney, Agent, or Firm* — Hansen IP Law PLLC

(57) ABSTRACT

An audio-visual system is shown and describe. The audio-visual system comprises a soundbar and a television monitor assembly. The television monitor assembly comprises a television monitor, a first support and a second support. The first support comprises a first base member and a first vertical member, and the second support comprises a second base member and a second vertical member. The television monitor assembly has one or more free-standing configurations in which the lengths of the first and second base members are substantially perpendicular to the front and rear surfaces of the television monitor and one or more wall-mounted configurations in which the lengths of the first and second base members are substantially parallel to the front rear surfaces of the television monitor. An audio visual system may be provided by attaching a soundbar to the first and second base members in the free-standing configurations.

27 Claims, 14 Drawing Sheets

(51) Int. Cl.
  *F16M 11/04*   (2006.01)
  *F16M 11/20*   (2006.01)
  *H04N 5/64*    (2006.01)
  *H04N 5/645*   (2006.01)
  *F16M 11/08*   (2006.01)
  *G06F 1/16*    (2006.01)

(52) U.S. Cl.
  CPC ............... *H04N 5/64* (2013.01); *H04N 5/642* (2013.01); *H04N 5/645* (2013.01); *F16M 11/08* (2013.01); *G06F 1/1601* (2013.01)

(58) Field of Classification Search
  USPC .......................................... D6/310, 320, 332
  See application file for complete search history.

(56) References Cited

U.S. PATENT DOCUMENTS

| | | | |
|---|---|---|---|
| 9,072,379 B2 | 7/2015 | Cassidy et al. | |
| 2006/0243869 A1* | 11/2006 | Petrick | F16M 11/2064 248/188.7 |
| 2007/0052872 A1* | 3/2007 | Vermeulen | A47B 81/065 348/787 |
| 2007/0145212 A1* | 6/2007 | Yamanaka | F16M 11/22 248/176.1 |
| 2007/0195210 A1* | 8/2007 | Rudzki | H04N 9/3141 348/E5.143 |
| 2010/0027199 A1* | 2/2010 | Boycher | G09F 7/18 361/679.01 |
| 2010/0284137 A1* | 11/2010 | VanDuyn | F16M 11/38 361/679.21 |
| 2010/0315768 A1* | 12/2010 | Green | F16M 11/08 361/679.21 |
| 2013/0279090 A1* | 10/2013 | Brandt | H04N 5/655 361/679.01 |
| 2013/0314852 A1* | 11/2013 | Kincaid | F16M 11/04 361/679.01 |
| 2014/0034793 A1* | 2/2014 | Stemple | F16M 11/12 248/201 |
| 2015/0070340 A1* | 3/2015 | Trachtenberg | H04N 5/64 345/211 |
| 2017/0009935 A1* | 1/2017 | Theis | F16M 11/041 |
| 2017/0164080 A1* | 6/2017 | Chung | H04R 1/028 |
| 2019/0342515 A1* | 11/2019 | Bergstrøm Graabæk | F16M 13/022 |
| 2021/0247020 A1* | 8/2021 | Janechek | F16M 11/2042 |
| 2021/0317945 A1* | 10/2021 | Kim | G06F 1/181 |
| 2022/0408931 A1* | 12/2022 | Pavlov | F16M 11/26 |

FOREIGN PATENT DOCUMENTS

| | | | | |
|---|---|---|---|---|
| GB | 2528900 A | * | 2/2016 | ............ A47B 23/02 |
| KR | 1020170051977 A | | 5/2017 | |
| WO | WO-2011130157 A2 | * | 10/2011 | ............ F16M 11/00 |
| WO | WO-2014068324 A1 | * | 5/2014 | ............ F16M 13/02 |
| WO | WO-2017097322 A1 | * | 6/2017 | |

* cited by examiner

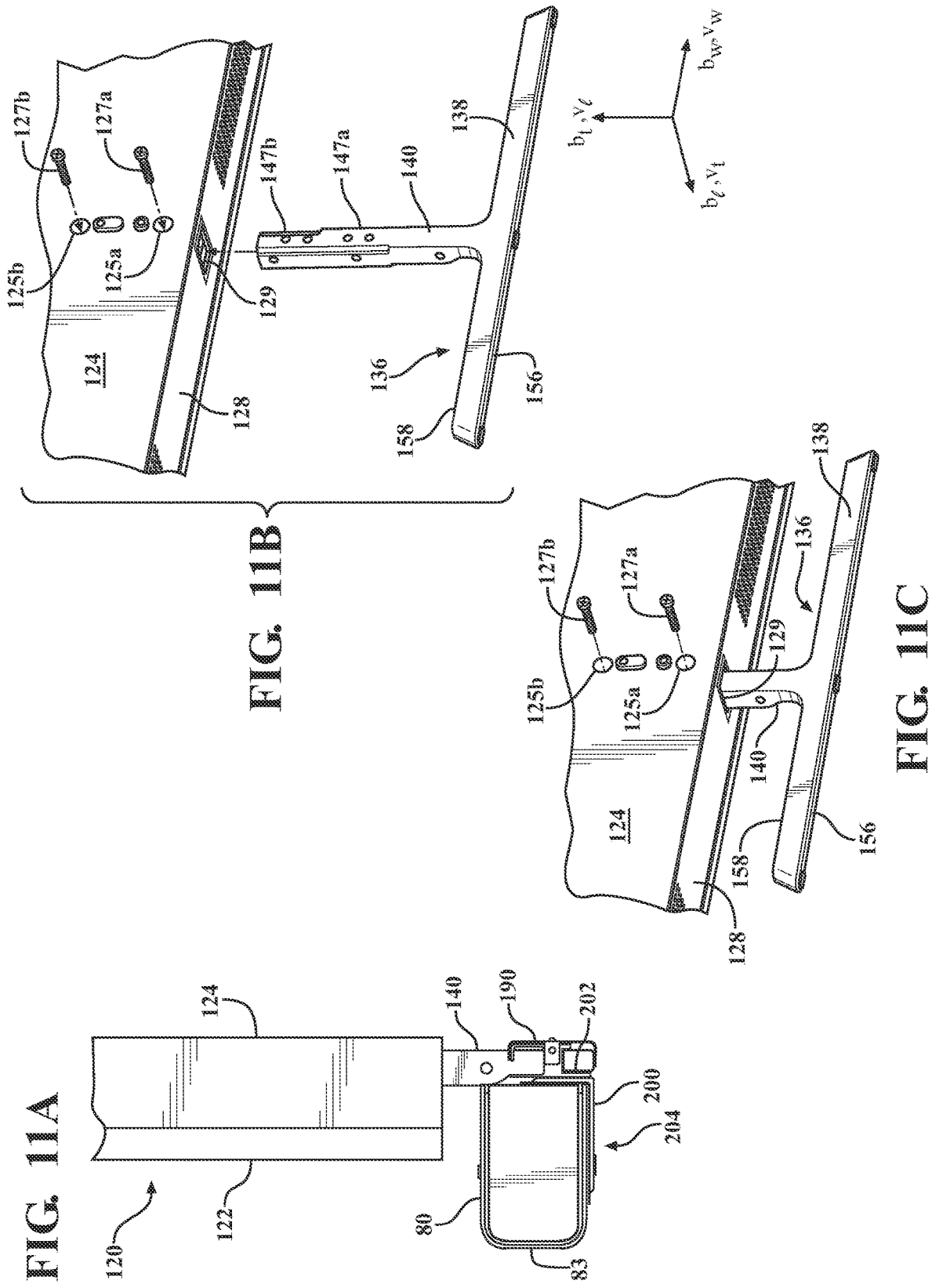

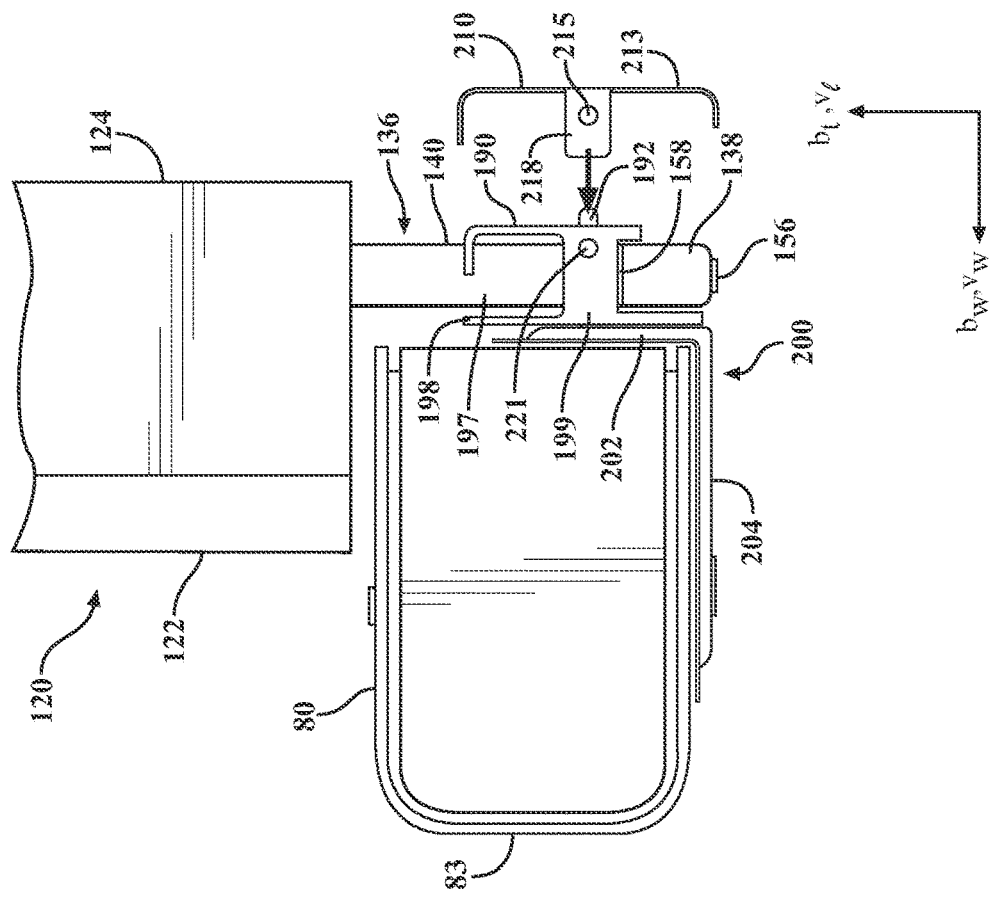
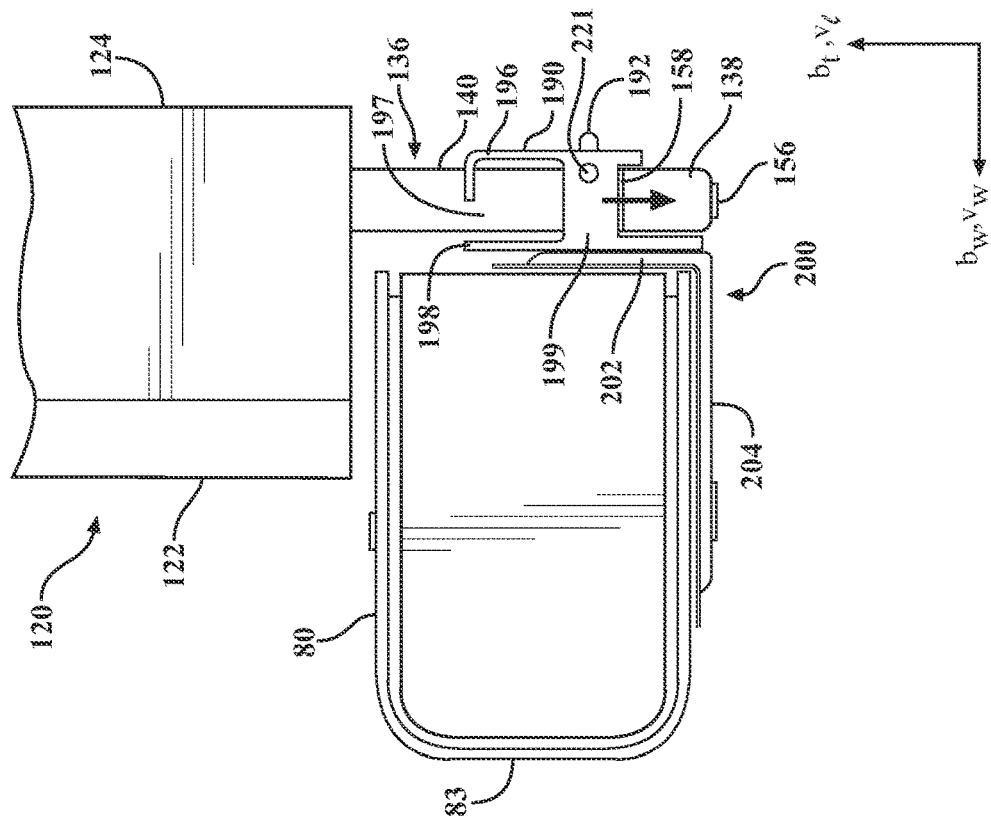
FIG. 11E
FIG. 11D

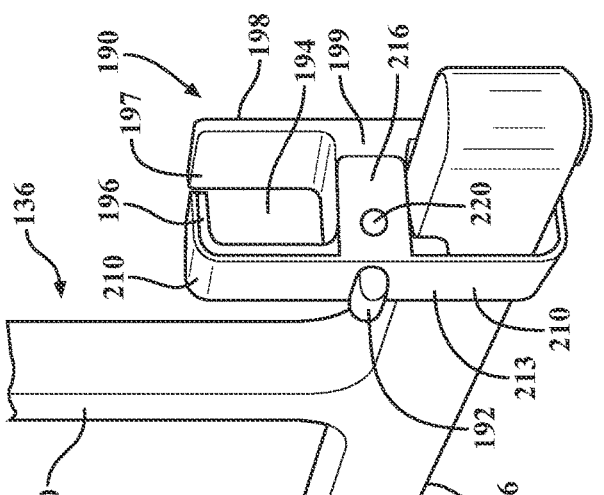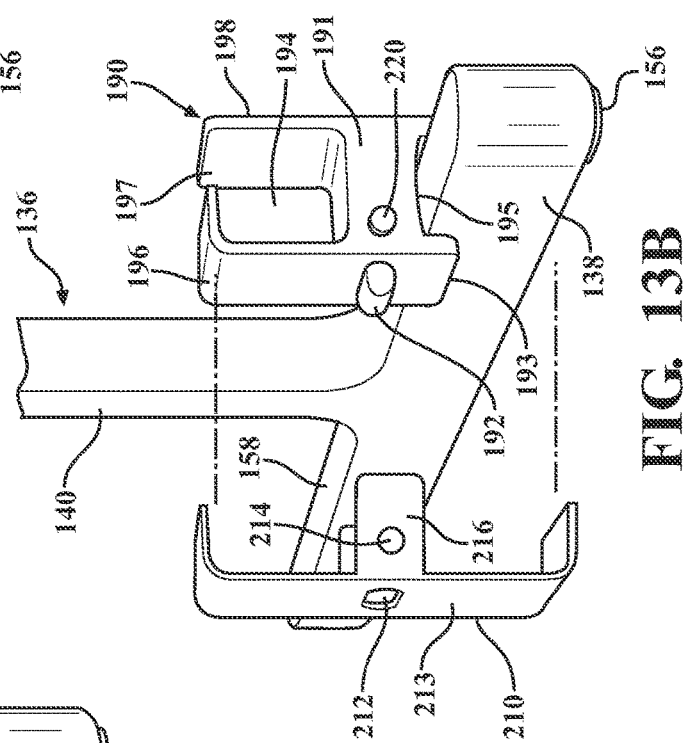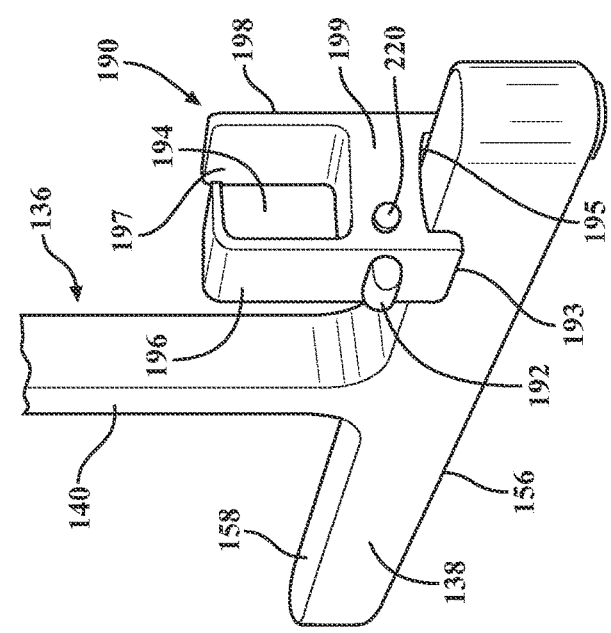

TELEVISION MONITOR WITH DUAL CONFIGURATION SUPPORT ASSEMBLY

CROSS-REFERENCE TO RELATED APPLICATIONS

This application claims the benefit of U.S. Provisional Application No. 63/139,060, filed Jan. 19, 2021, the entirety of which is hereby incorporated by reference.

TECHNICAL FIELD

This disclosure relates generally to stands for televisions or other visual displays such as video and computer monitors, and more specifically, to stands that have multiple configurations, such as a wall-mountable configuration and a free-standing configuration.

BACKGROUND

Consumers often wish to have the option of configuring televisions or other video monitors in different locations and in different ways depending on the size of the monitor, the room it is placed in, and the available furniture. It is sometimes desirable to allow the monitor to stand freely on a table, or an entertainment center. It may also be desirable to mount the monitor on a wall. In cases where the monitor is part of an audio-visual system, an audio device such as a soundbar may be provided and may require different placement relative to the monitor and/or additional hardware in the different configurations. Thus, it would be desirable to provide a television monitor assembly that can be reconfigured in free-standing and wall-mountable configurations and which reduces the amount of support hardware required for both configurations.

SUMMARY

In accordance with a first aspect of the present disclosure, a television monitor assembly is provided. The television monitor assembly comprises a television monitor having a height defining a monitor height axis and a width defining a monitor width axis, the television monitor further comprising a front surface and a rear surface spaced apart along a monitor thickness axis. The television monitor assembly also comprises a first pair of support members, comprising a first base member and a first vertical member, the first base member having a first base member length defining a first base member length axis, a first base member width defining a first base member width axis, and a first base member thickness defining a first base member thickness axis, wherein the first base member length is greater than the first base member width and the first base member thickness. The television monitor assembly further comprises a second pair of support members comprising a second base member and a second vertical member. the second base member having a second base member length defining a second base member length axis, a second base member width defining a second member width axis, and a second base member thickness defining a second base member thickness axis, wherein the second base member length is greater than the second base member width and the second base member thickness. The television monitor assembly has (i) a free-standing configuration in which the first vertical member and the second vertical member are attached to the rear surface of the television monitor such that the first vertical member length axis is substantially parallel to the monitor height axis, the second vertical member length axis is substantially parallel to the monitor height axis, the first vertical member is spaced apart from the second vertical member along the monitor width axis, the first base member is attached to the first vertical member such that the first base member length axis is substantially perpendicular to the front surface of the monitor, and the second base member is attached to the second vertical member such that the length of the second base member is substantially perpendicular to the front surface of the monitor, and (ii) a wall-mountable configuration, in which the first vertical member and the second vertical member are attached to the rear surface of the television monitor such that the first vertical member length axis is substantially parallel to the monitor height axis, the second vertical member length axis is substantially parallel to the monitor height axis, and the first vertical member is spaced apart from the second vertical member along the monitor width axis. In some examples, when the television monitor assembly is in the wall-mountable configuration, the first base member is attached to the first vertical member such that the first base member length axis is substantially parallel to the monitor width axis, and the second base member is attached to the second vertical member such that the second base member length axis is substantially parallel to the monitor width axis. In certain examples, an audio-visual system is provided which comprises the television monitor assembly and a soundbar, wherein when the television monitor assembly is in the free-standing configuration, the soundbar is selectively attachable to the upper surface of the first base member and the upper surface of the second base member. In the same or other examples, when the television monitor assembly is in the wall-mountable configuration, the soundbar is selectively attachable to the bottom surface of the first base member and the bottom surface of the second base member.

In accordance with a second aspect of the present disclosure, a television monitor assembly is provided which comprises a television monitor, a first base member, a second base member, a first vertical member, and a second vertical member, wherein the television monitor assembly has (i) a free-standing configuration in which the first base member is attached to the first vertical member to define a first spatial orientation between the first base member and the first vertical member and a first spatial orientation between the first base member and the television monitor, the second base member is attached to the second vertical member to define a first spatial orientation between the second base member and the second vertical member and a first spatial orientation between the second base member and the television monitor, and (ii) a wall-mountable configuration in which the first base member is attached to the first vertical member to define a second spatial orientation between the first base member and the first vertical member and a second spatial orientation between the second base member and the television monitor, and in which the second base member is attached to the second vertical member to define a second spatial orientation between the second base member and the second vertical member and a second spatial orientation between the second base member and the television monitor. In certain examples, an audio-visual system comprising the television monitor assembly and a soundbar is provided, wherein in the free-standing configuration, the soundbar is attached to the first base member and the second base member to define a first spatial orientation between the soundbar and the first base member and a first spatial orientation between the soundbar and the second base member, and in the wall-mountable configuration, the soundbar is attached to the first base member and the second base member to define a second spatial orientation between the soundbar and the first base member and a second spatial orientation between the soundbar and the second base member.

In accordance with a third aspect of the present disclosure, a method of mounting a free-standing television monitor assembly on a wall is provided, wherein the free-standing television monitor assembly comprises a television monitor having a front surface and a rear surface, a first vertical member attached to the rear surface of the television monitor, and a second vertical member attached to the rear surface of the television monitor, wherein the first vertical member has a first vertical member first end and a first vertical member second end spaced apart along a first vertical member length axis, the second vertical member has a second vertical member first end and a second vertical member second end spaced apart along a second vertical member length axis, the first vertical member second end is spaced apart from the television monitor along the first vertical member length axis, and the second vertical member second end is spaced apart from the television monitor along the second vertical member length axis, the first vertical member second end is attached to a first base member, the first base member having a first base member length defining a first base member length axis, and wherein the second vertical member second end is attached to a second base member having a second base member length defining a second base member length axis, wherein the first base member length axis is substantially perpendicular to the television monitor front surface, and the second base member length axis is substantially perpendicular to the television monitor front surface. The method comprises detaching the first base member from the first vertical member; detaching the second base member from the second vertical member; attaching the first base member to the first vertical member such that the first base member length axis is substantially parallel to the television monitor front surface; attaching the second base member to the second vertical member such that the second base member length axis is substantially parallel to the television monitor front surface; and attaching the rear surface of the television monitor to the wall.

In accordance with a fourth aspect of the present disclosure, a television monitor assembly is provided which comprises a television monitor having a height defining a monitor height axis and a width defining a monitor width axis, the television monitor further comprising a front surface and a rear surface spaced apart along a monitor thickness axis. The television monitor assembly also includes a first support comprising a first base member and a first vertical member, the first base member having a first base member length defining a first base member length axis, a first base member width defining a first base member width axis, and a first base member thickness defining a first base member thickness axis, wherein the first base member length is greater than the first base member width and the first base member thickness. The television monitor assembly also includes a second support comprising a second base member and a second vertical member, the second base member having a second base member length defining a second base member length axis, a second base member width defining a second member width axis, and a second base member thickness defining a second base member thickness axis, wherein the second base member length is greater than the second base member width and the second base member thickness, wherein the television monitor assembly has (i) a free-standing configuration in which the first support is attached to the television monitor such that the first base member length axis and the second base member length axis are substantially perpendicular to the monitor width axis; and (ii) a wall-mounted configuration in which the second support is attached to the television monitor such that the first base member length axis and the second base member length axis are substantially parallel to the monitor width axis, In certain examples, the first support is integrally formed to comprise the first base member and the first vertical member, and the second support is integrally formed to comprise the second base member, and the second vertical member. In other examples, the first support member comprises a first support assembly that includes the first base member and the first vertical member, and the second support comprises a second support assembly that includes the second base member and the second vertical member.

BRIEF DESCRIPTION OF THE DRAWINGS

FIG. 11A is a side elevation of the television monitor assembly of FIG. 8 in a first wall-mounted configuration with an attached audio device in which the audio device projects further away from the television monitor relative to a second wall-mounted configuration;

FIGS. 11B-11C are close-up views of the rear of the television monitor assembly of FIG. 8 showing the installation of a first support in the first wall-mounted configuration;

FIGS. 11D-11E are close-up side elevation views of the television monitor assembly of FIG. 8 showing the installation of a retention bracket in the first wall-mounted configuration;

FIGS. 13A-13C are close-up perspective views of the first support of the television monitor assembly of FIG. 8 showing the installation of a retention bracket used in the first and second wall-mounted configurations.

Like reference numerals refer to like parts when referring to the drawings herein.

DETAILED DESCRIPTION

As discussed below, the present disclosure provides television monitor assemblies that are configurable from one or more wall-mounted configurations to one or more free-standing configurations. In preferred examples, the television monitor assemblies comprise first and second supports that comprise a vertical member and a base member, and the supports are adjustably configurable to provide the one or more wall-mounted and one or more free-standing television monitor assembly configurations. As compared to known television monitor assemblies, the examples of such reconfigurable television monitor assemblies described herein reduce the amount of hardware required to provide free-standing and wall-mounted televisions and to attach audio devices, in particular soundbars, to the television monitor assembly.

Figure 1:
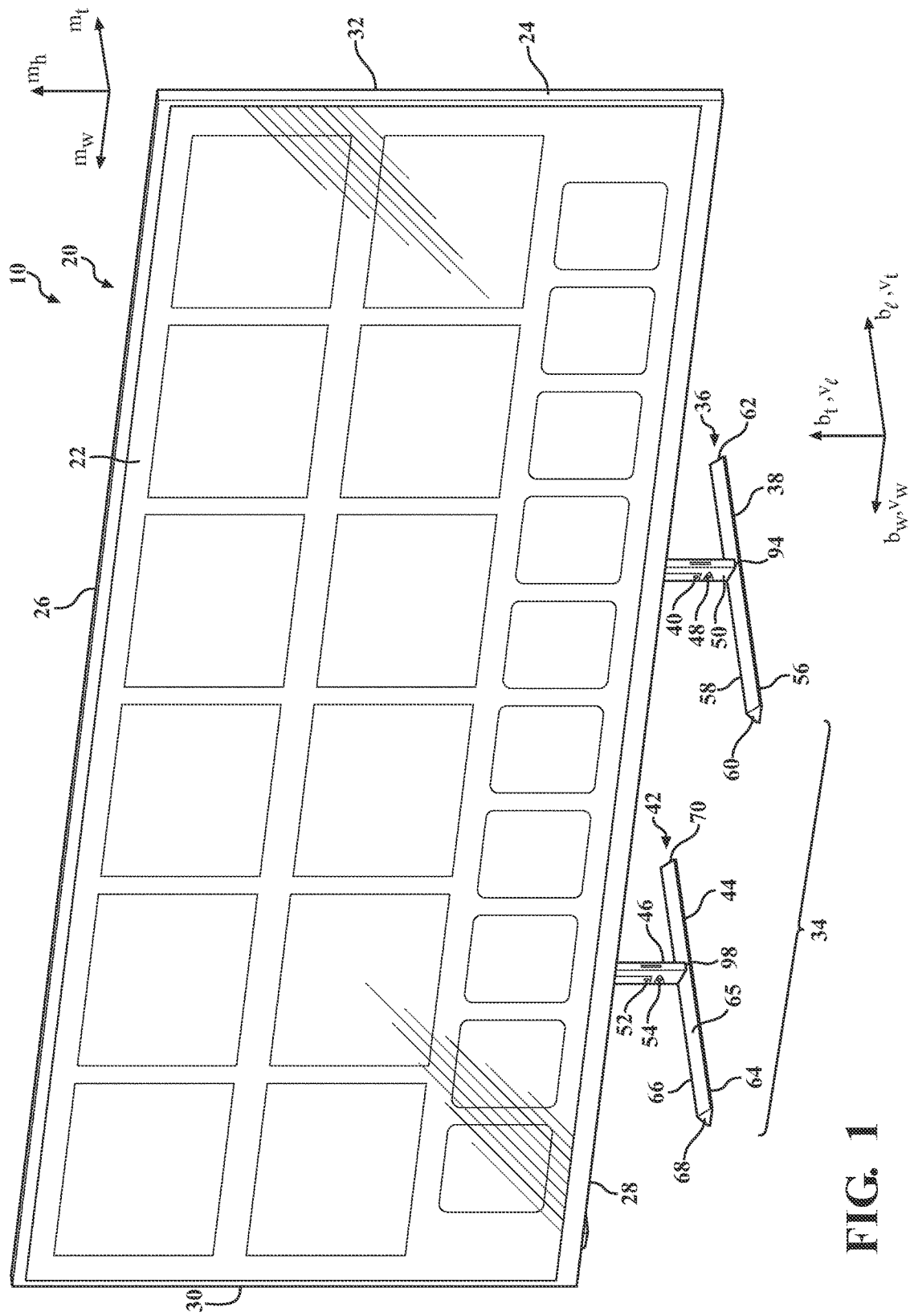
FIG. 1 is a front perspective view of a first embodiment of a television monitor assembly in a first free-standing configuration.

Referring to FIG. 1, a television monitor assembly 10 is depicted which has both free-standing and wall-mounted configurations. More specifically, television monitor assembly 10 that has a support assembly 34 that can be reconfigured into a free-standing and wall-mountable configuration. Support assembly 34 comprises first support subassembly 36 and second support subassembly 42. The spatial orientation between the support assembly 34 components is different in the free-standing and wall-mountable configurations. The television monitor assembly 10 may be used with an audio device 80 to define an audio-visual system 15. In certain examples, the spatial orientation between the sound bar and the television is the same in the free-standing and wall-mountable configurations.

Referring to FIG. 1 a television monitor assembly 10 is provided. The television monitor assembly 10 comprises a television monitor 20 (which may be any type of video monitor or visual display) that includes a front surface 22 defining the viewing screen and a rear surface 24 (not visible) that includes a plurality of connectors for transmitting and receiving audio and video signals. The monitor 20 has a first end 30 spaced apart from a second end 32 along a monitor width axis $m_w$ and a top surface 26 spaced apart from a bottom surface 28 along a monitor height axis $m_h$. The front surface 22 and the rear surface 24 are spaced apart along a monitor thickness axis $m_t$. The monitor 20 may receive video and/or audio signals from any conventional source such as a cable box, over the air antenna, a receiver, a CD player, an amplifier, a soundbar, a DVD player or a Blu-Ray Player.

Figure 4A:
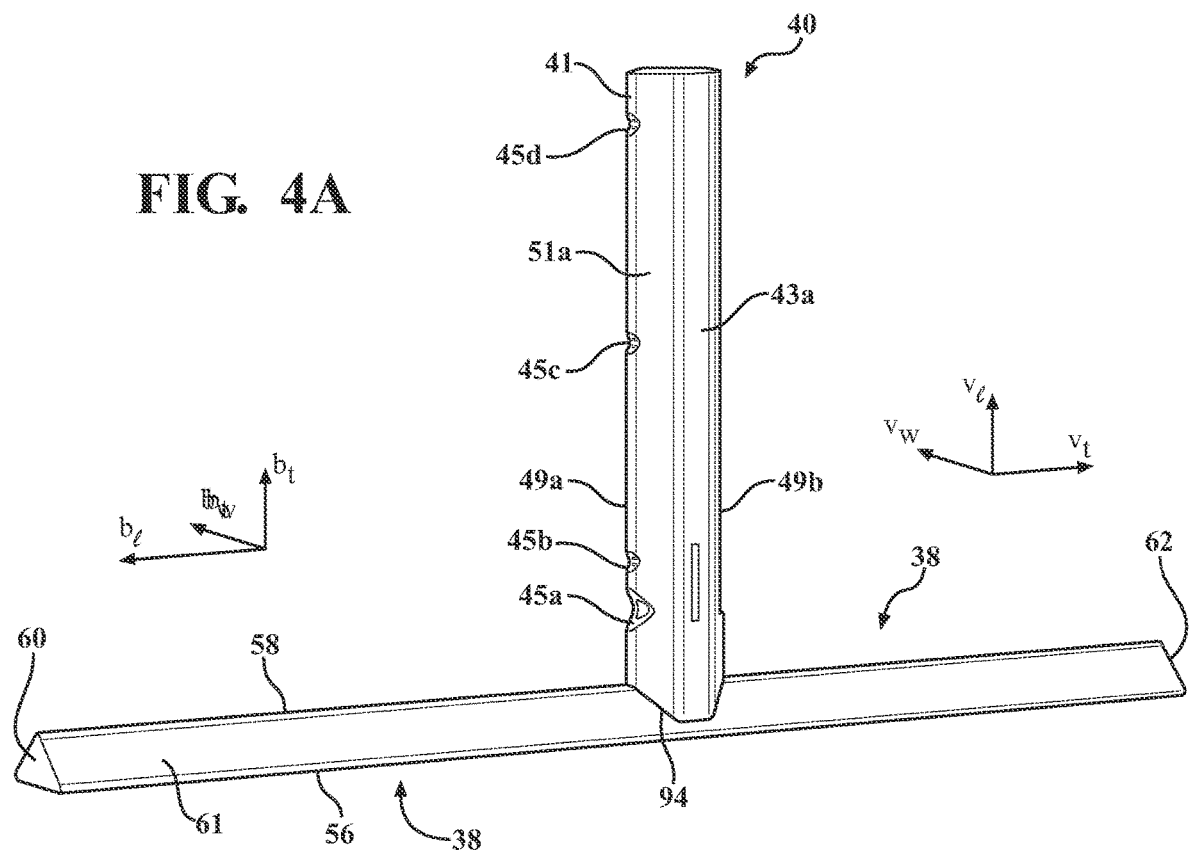
FIG. 4A is a first perspective view of a first monitor support assembly in a free-standing configuration.

Support assembly 34 is provided and in FIG. 1 is assembled into a free-standing configuration that allows monitor 20 to stand without any lateral support from another piece of furniture or a wall. Support assembly 34 is subdivided into a first support assembly that comprises a first base member 38 and a first vertical member 40, and a second support assembly that comprises a second base member 44 and a second vertical member 46. The first base member 38 has a first end 60 spaced apart from a second end 62 (visible in FIG. 4A) along a base member length axis $b_l$ and a bottom surface 56 spaced apart from an upper surface 58 along a base member thickness axis $b_t$. A first base member first side wall 61 is spaced apart from a first base member second side wall 63 (not visible) along a first base member width axis $b_w$. Similarly, second base member 44 has a first end 68 spaced apart from a second end 70 along the base member length axis $b_l$, and a second base member bottom surface 64 spaced apart from a second base member upper surface 66 along base member thickness axis $b_t$. Second base member first side wall 65 is spaced apart from second base member second side wall 67 (not visible) along the base member width axis $b_w$. In the free-standing configuration of FIG. 1, the first base member 38 and second base member 44 are oriented with their length axes $b_l$ perpendicular to monitor front surface 22, monitor width axis $m_w$, and monitor height axis $m_h$ but parallel to monitor thickness axis $m_t$. In addition to first and second base members 38, 44 and vertical members 40, 46 members, the support assembly 34 includes, and preferably consists exclusively of, two brackets and a plurality of fasteners (e.g., screws, bolts, anchors, rivets, etc.).

Figure 4B:
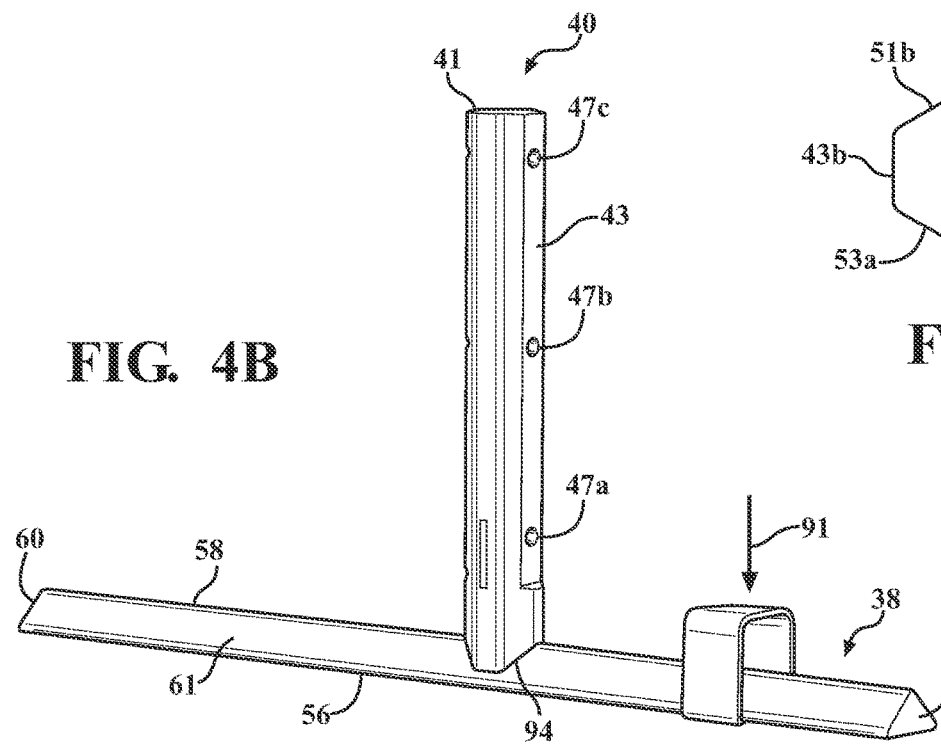
FIG. 4B is a second perspective view of the first monitor support assembly of FIG. 4A with a cable management clip.
Figure 4C:
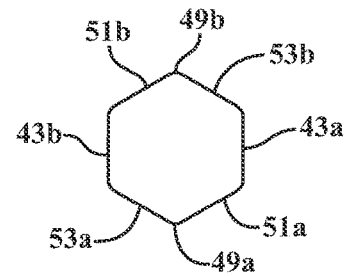
FIG. 4C is a top plan view of the first vertical member of FIGS. 4A and 4B.

As best seen in FIG. 4C, first vertical member 40 has a hexagonal cross-sectional profile when viewed along the first vertical member length axis $v_l$. First vertical member 40 has first end 41 (FIGS. 4A, 4B) spaced apart from a second end 94 along a vertical member length axis $v_l$, a front attachment surface 49a spaced apart from a rear attachment surface 49b along a vertical member thickness axis $v_t$, and a first lateral side 43a spaced apart from a second lateral side 43b (FIG. 4c) along a vertical member width axis $v_w$. First diagonal side 51a is spaced apart from second diagonal side 51b along a direction between the vertical member width axis $v_w$ and the vertical member thickness axis $v_t$, as are third diagonal side 53a and fourth diagonal side 54b relative to one another. Front attachment surface 49a has a plurality of openings 45a, 45b, and 45c arranged along the vertical member length axis $v_l$ which align with corresponding openings 47a, 47b, and 47c on rear attachment surface 49b to receive fasteners (e.g., screws) that will connect first vertical member 40 to the rear surface 24 of video monitor 20. Although not separately shown, second vertical member 46 has the same set of corresponding surfaces and axes and is identical to first vertical member 40.

Figure 5A:
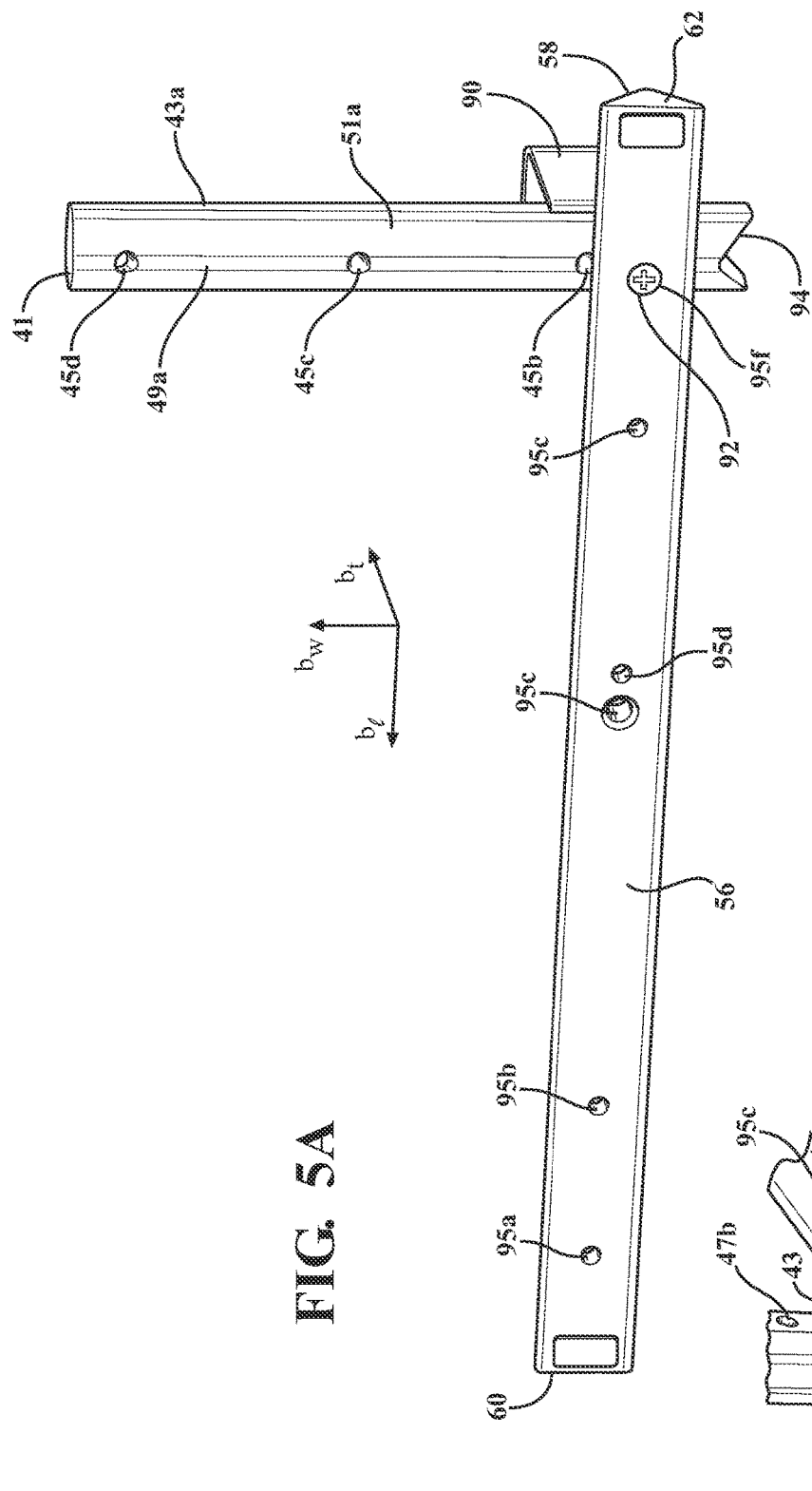
FIG. 5A is a first perspective view of a first support assembly in wall-mountable configuration.

First base member 38 has a triangular shape when viewed in a direction along the base member length axis $b_l$. When viewed along axis $b_l$ first base member first side wall 61 slopes toward first base member second side wall 63 (not shown) when moving from bottom surface 56 to upper surface 58. The second end 94 of first vertical member 40 is recessed along the vertical member length axis $v_l$ in a direction toward first end 41 of vertical member 40. The resulting recess cooperatively and abuttingly engages upper surface 58 and first and second side walls 61 and 63 of first base member 38. As shown in FIG. 5A, a plurality of openings 95a-95f are arranged along the bottom surface 56 of first base member 38 and align with corresponding openings in upper surface 58 of first base member 38 to receive fasteners that connect first base member 38 to first vertical member 40. In the free-standing configuration of FIG. 1, second base member 44 is identically oriented in all respects to first base member 38 and engages second vertical member 46 in the same manner that first base member 38 engages first vertical member 40. As shown in FIG. 1, second end 98 of second vertical member 46 is recessed and engages and connects to first and second side walls 65 and 67 (not shown) of second vertical member 46 in the same way that first vertical member second end 94 is recessed and engages and connects to first base member first side wall 61, second side wall 63 and upper surface 58.

The terms "length," "width," and "thickness" define different dimensions of a given member relative to other dimensions of that member. However, the length dimension of the first and second base members 38 and 44 is greater than both the width and thickness dimensions by a factor of least two, preferably at least eight, and more preferably at least ten. In the figures, the base members 38 and 44 are shaped like a triangular prism, however, other suitable shapes may be used. The vertical members have a hexagonal cross-section as best seen in FIG. 4c. However, other suitable shapes may be used. When the term "axis" is used with respect to a particular dimension of a particular member herein, that axis stays fixed relative to the member even if the member's position or orientation changes relative to other components. Referring to FIG. 1, the same set of axes is used to refer to the length, widths, and thicknesses of both base members 38 and 44. The same coordinate system is used to define the length, width, and thickness axes ($v_l$, $v_w$, $v_t$) of the vertical members 40, 46. The labeling of the coordinate system indicates that the base member 38, 44 length axis $b_l$ is parallel to the vertical member 40, 46 thickness axis $v_t$, that the base member 38, 44 width axis $b_w$ is parallel to the vertical member width axis $v_w$, and that the base member thickness axis $b_t$ is parallel to the vertical member length axis $v_l$. The monitor coordinate system shows the relative relationship between the monitor width, height, and thickness axes $m_w$, $m_h$, and $m_t$ and the base member and vertical member axes $b_w$, $v_w$, $b_t$, $v_l$, $b_l$, $v_t$. With respect to the monitor 20, the terms "height" and "width" are used in their conventional sense when normally viewing the front surface 22, and the thickness refers to the distance between the front surface 22 and rear surface 24.

Figure 2:
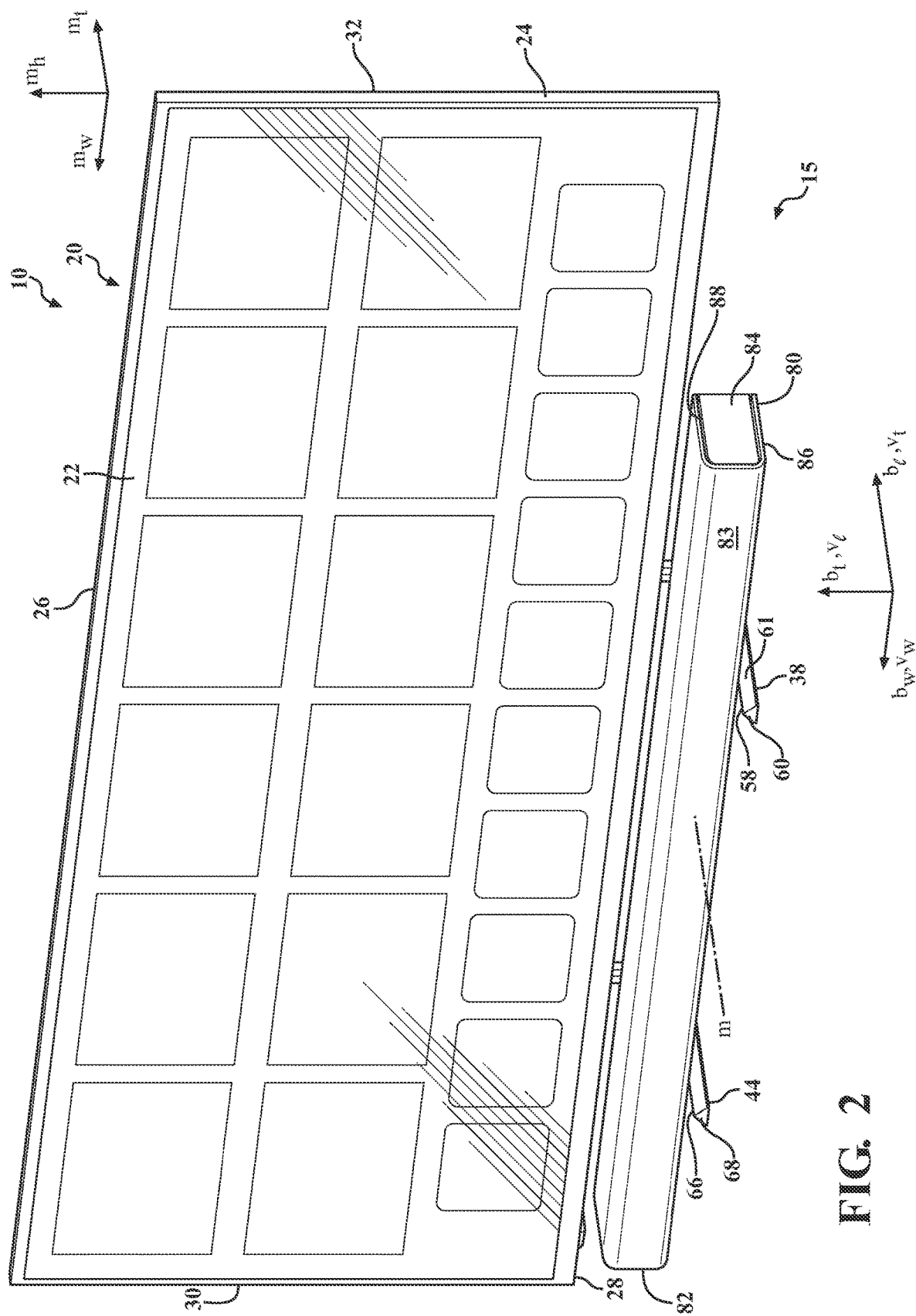
FIG. 2 is a perspective view of an audio-visual system comprising the television monitor assembly of FIG. 1.

Referring to FIG. 2, an audio-visual system 15 comprising the television monitor assembly 10 of FIG. 1 and an elongated soundbar 80 is provided and is shown in a free-standing configuration. Elongated soundbar 80 has a first end 82 spaced apart from a second end 84 along a soundbar length axis that is parallel to the monitor width axis $m_w$. Soundbar 80 has a bottom surface 86 spaced apart from an upper surface 88 along a soundbar height axis that is parallel to the monitor height axis $m_h$. Soundbar 80 also has a front surface 83 spaced apart from a rear surface along a soundbar thickness axis that is parallel to the monitor thickness axis $m_t$. A plurality of speaker drivers is arranged along the soundbar length axis and located behind the cover extending over soundbar 80. The speaker drivers have median axes M that are parallel to the monitor thickness axis $m_t$. In the free-standing configuration of FIG. 2, soundbar front surface 83 is spaced apart from monitor front surface 22 along the monitor thickness axis $m_t$ and slightly below monitor bottom surface 28 along monitor height axis $m_h$. Thus, the speaker drivers are spaced apart from the monitor 20 along the monitor thickness axis $m_t$ and along the monitor height axis $m_h$. The first base member 38 bottom surface 56 openings 95a-95f shown in FIG. 5A and corresponding openings in the upper surface 58 of base member 38 may be used to attach the first base member 38 to the soundbar 80 and may align with complementary openings in the bottom of the soundbar 80 housing to receive screws or other suitable fasteners. Second base member 44 is connected to soundbar 80 in the same way, albeit at a position spaced apart from the first base member 38 along the length axis of the soundbar 80 and the monitor width axis $m_w$.

Figure 3:
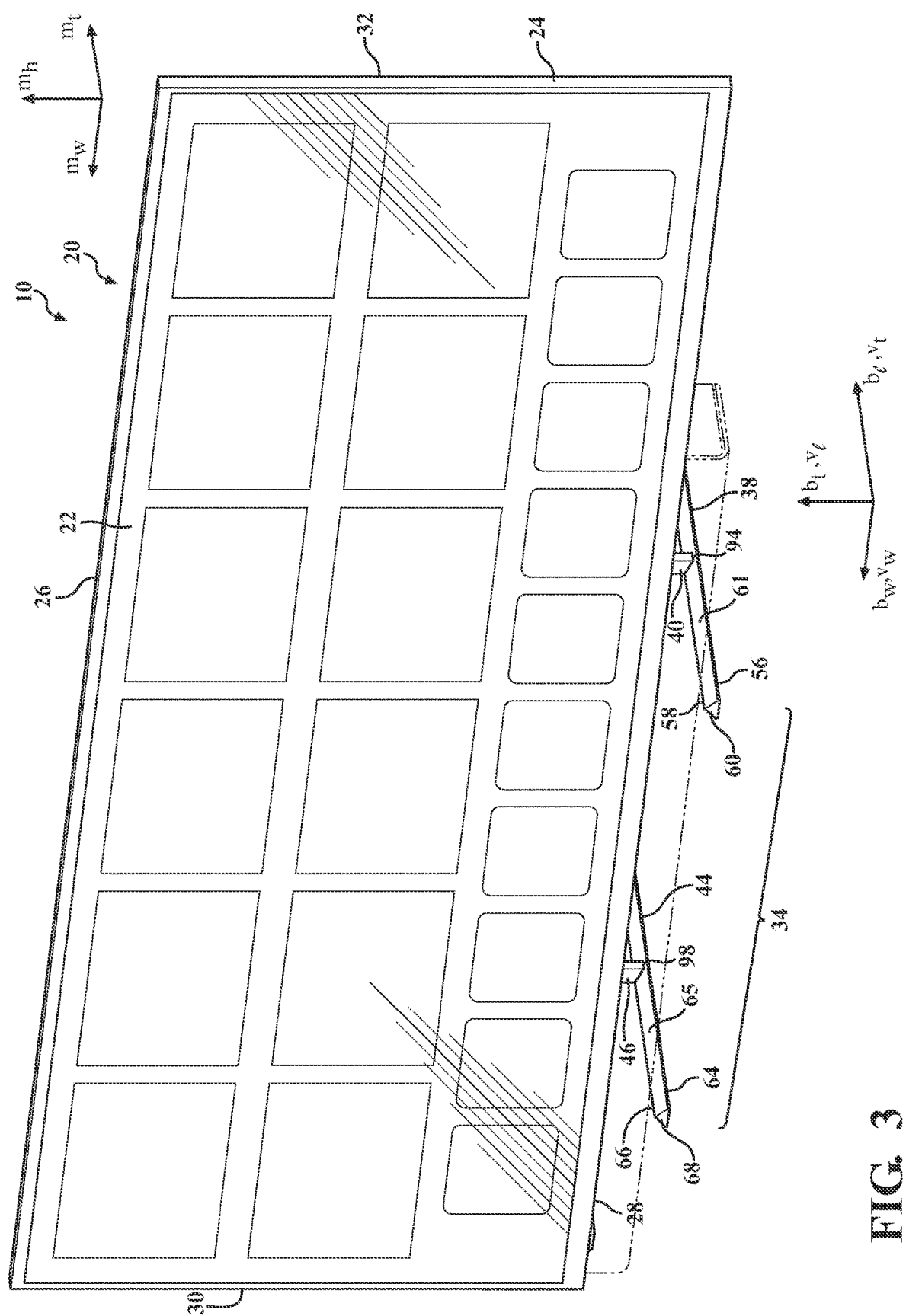
FIG. 3 is a perspective view of the television monitor assembly of FIG. 1 in a second free-standing configuration.

FIG. 3 shows the television monitor assembly of FIG. 1 in a second free-standing configuration in which the bottom surface 28 of monitor 20 is closer to the first and second base member upper surfaces 58 and 66. Soundbar 80 may still be attached to the first and second base members 38 and 44 in the manner described with respect to FIG. 2. However, soundbar 80 will not be spaced apart from monitor 20 along the monitor height axis $m_h$ and may eclipse part of the front surface 22 of monitor 20. Openings 45a-45d allow the first vertical member 40 to connect to different vertical positions along the rear surface 24 of the monitor 20, and thereby alter the distance between the monitor bottom surface 28 and the first and second base member upper surfaces 58, 66 along the monitor height axis $m_h$.

Figure 6:
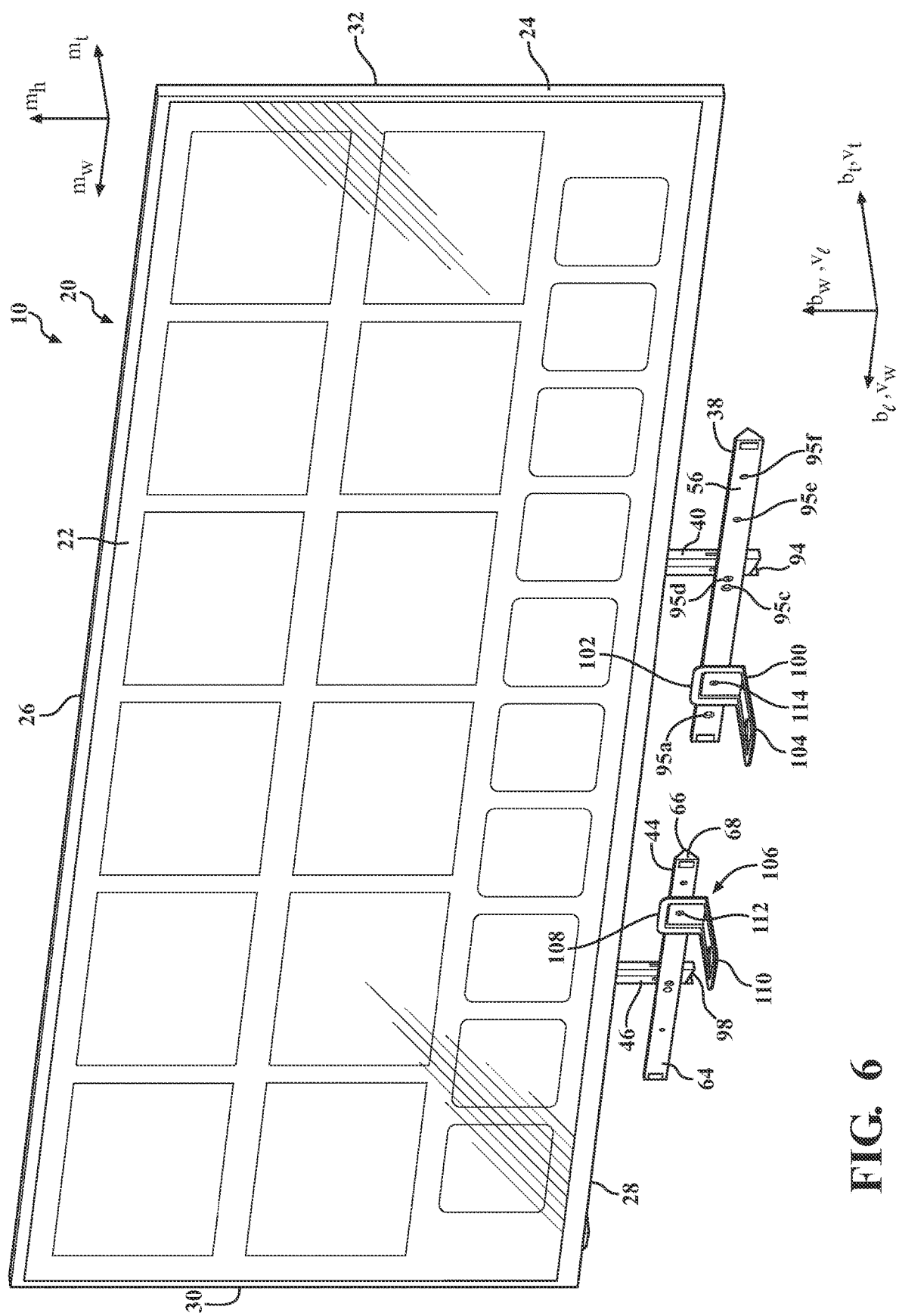
FIG. 6 is the television monitor assembly of FIG. 1 in a wall-mounted configuration.

FIG. 6 depicts the television monitor assembly of FIG. 1 in a wall-mounted configuration. Monitor 20 is connected to a wall using a known connection apparatus such as one compliant with the VESA (Video Electronics Standards Association) standard for flat display mounting interfaces. The first and second vertical members 40 and 46 are attached to the rear surface 24 in the same manner as in FIG. 1. However, the spatial orientation between first base member 38 and first vertical member 40 is different in the wall-mounted configuration of FIG. 6 than in the free-standing configuration of FIG. 1, as is the spatial orientation between second base member 44 and second vertical member 46. In addition, the spatial orientation between first base member 38 and monitor 20 is different in the wall-mounted configuration of FIG. 6 than in the free-standing configuration of FIG. 1, as is the spatial orientation between the second base member 44 and the monitor 20. More specifically, in the wall-mounted configuration of FIG. 6, the bottom surface 56 of first base member 38 is parallel to the length axis $v_l$ and the width axis $v_w$ of first vertical member 40. The bottom surface 56 is perpendicular to the first vertical member 40 thickness axis $v_t$. In contrast, in the free-standing configuration of FIG. 1, first base member 38 bottom surface 56 is parallel to the first vertical member thickness axis $v_t$, and width axis $v_w$ and perpendicular to the first vertical member 40 length axis $v_l$. Also, in the wall-mounted configuration of FIG. 6, the bottom surface 56 of first base member 38 is parallel to the monitor width axis $m_w$ and the monitor height axis $m_h$ and is perpendicular to the monitor thickness axis $m_t$. The spatial orientations of the second base member 44 and second vertical member 46 are the same as those between the first base member 38 and first vertical member 40 in both the free-standing configuration of FIG. 1 and the wall-mounted configuration of FIG. 2. The spatial orientations of the first and second base members 38 and 44 relative to their corresponding vertical members 40 and 46 and relative to the monitor 20 are the same regardless of whether the soundbar 80 is provided or not.

Referring again to FIG. 6, in some wall-mounted implementations, the soundbar 80 may be directly connected to the bottom surfaces 56, 64 of first and second base members 38 and 44. However, in FIG. 6 the first and second base members 38 and 44 are provided with respective brackets 100 and 106. Bracket 100 has a connection portion 102 and a support portion 104. The connection portion 102 is parallel and connected to first base member 38 bottom surface 56 by fastener 114 (which extends through an opening in connection portion 102 and opening 95b in the bottom surface 56 of first base member 38. Bracket 106 has a corresponding connection portion 108 and supporting portion 110 as well as a fastener 112 that projects through an opening in connection portion 108 and a corresponding opening in the bottom surface 64 of second base member 44. Support portions 104 and 110 project away from the first and second base members 38, 44 in a direction perpendicular to the bottom surfaces 56, 64 and parallel to the height axis $b_y$ of the first and second base members 38, 44.

Figure 7:
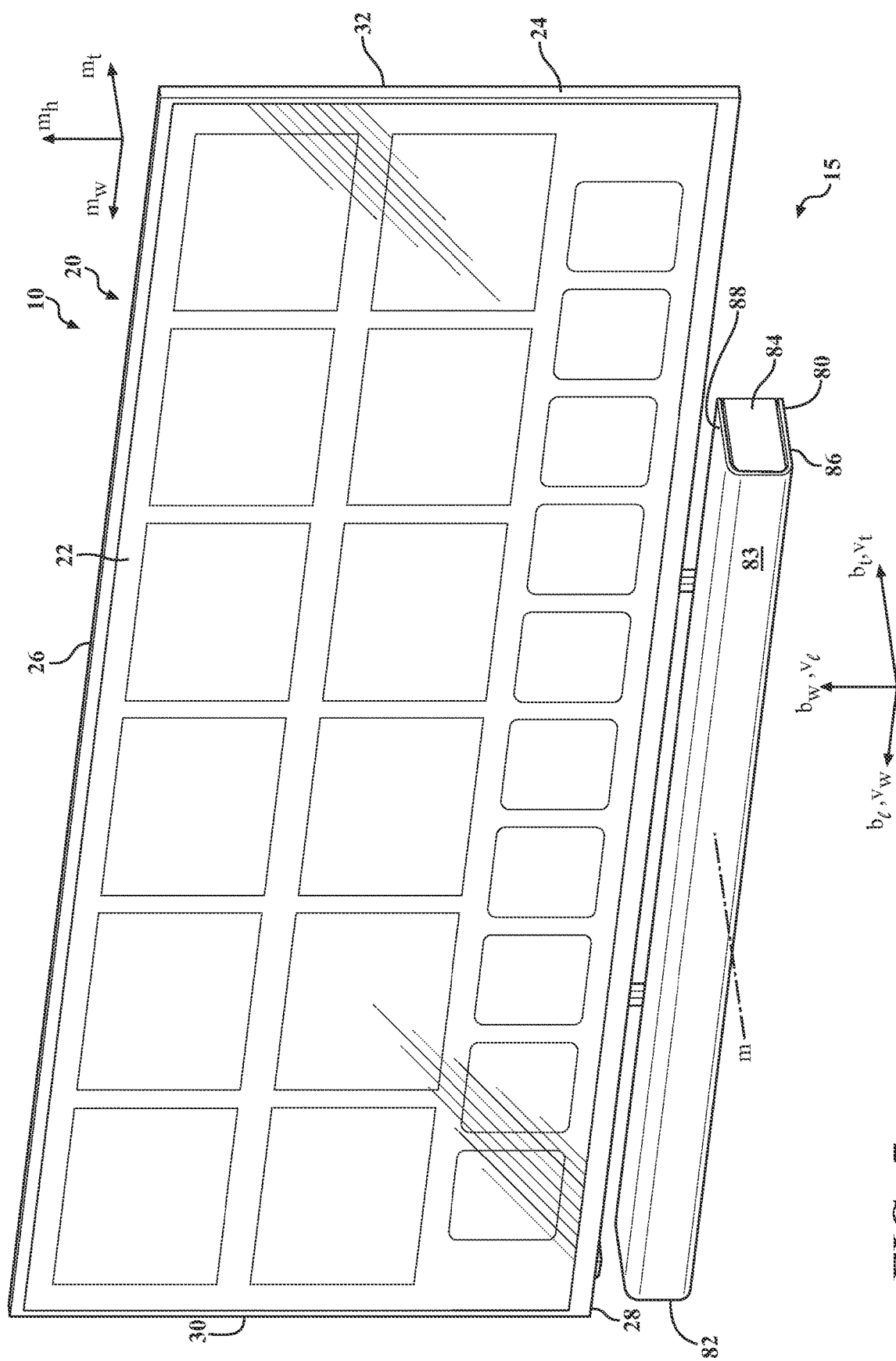
FIG. 7 is the audiovisual system of FIG. 2 in a wall-mounted configuration.

The soundbar 80 rests on support portions 104 and 110 and may be connected to them by appropriate fasteners. The positions of the brackets 100 and 106 along the monitor length axis $m_l$ may be adjusted as desired to different support locations along the length axis of the soundbar 80. FIG. 7 shows an audiovisual system in which soundbar 80 is installed on brackets 100 and 106. As FIGS. 1-3 and 6-7 indicate, the soundbar 80 may be connected to the television monitor assembly 10 in the same spatial orientation in both the free-standing and wall-mounted configurations. In addition, the monitor assembly need only be supplied with a support assembly 34 comprising a plurality of fasteners, first and second base members 38 and 44, first and second vertical members 40 and 46 and brackets 100 and 106 to allow the monitor assembly to be connected to the soundbar in both the free-standing and wall-mounted configurations. Thus, monitor assemblies in accordance with the present disclosure minimize the support hardware needed to provide free-standing and wall-mounted audiovisual systems that include a soundbar.

A method of converting the free-standing monitor assembly of FIG. 1 to the wall-mounted assembly of FIG. 6 will now be described. In accordance with the method, first base member 38 is detached from first vertical member 40 such as by unscrewing screws that are positioned in one of the bottom surface 56 openings 95a-95f and a corresponding opening in second end 94 of first vertical member 40. The second vertical member 46 is similarly detached from second base member 44. The first base member 38 is then attached with its upper surface 58 abuttingly engaging the first attachment surface 49a of first vertical member 40. FIG. 5A shows an example in which opening 95f in the bottom surface 56 of first base member 38 is attached to opening 45a on the front attachment surface 49a. The opening 45a (FIG. 4A) is recessed to a greater degree than openings 45b-45d to receive the upper surface 58 and a portion of the first base member side walls 61 and 63 (not shown). In FIG. 6, opening 95d in the bottom surface 56 of first base member 38 is aligned with opening 45a on first vertical member 40 and fastener 92 is inserted through the openings 45a and 95d to connect the first base member 38 to first vertical member 40. In both FIGS. 5A and 6 the bottom surface 56 of first base member 38 is parallel to the vertical member width axis $v_w$, vertical member length axis $v_l$, monitor width axis $m_w$ and monitor height axis $m_h$. Bottom surface 56 is perpendicular to vertical member thickness axis $v_t$ as well as to monitor thickness axis $m_t$.

Second base member 44 is then attached to second vertical member 46 in the same fashion as first base member 38 is attached to first vertical member 40. The base member and vertical member pairs 38, 40 and 44, 46 are preferably configured so as to be symmetrical to one another but need not be.

The connection portion 102 of first bracket 100 is attached to the bottom surface 56 of first base member 38 as described previously, and connection portion 108 of second base member 44 is similarly connected to bottom surface 64 of second base member. Soundbar bottom surface 86 is attached to the support portions 104 and 110 of brackets 100 and 106 as described previously. Monitor 20 is attached to a wall using a suitable connection apparatus such as a VESA standard-compliant attachment mechanism. To put the monitor assembly in the free-standing configuration, the foregoing steps may be reversed.

Figure 5B:
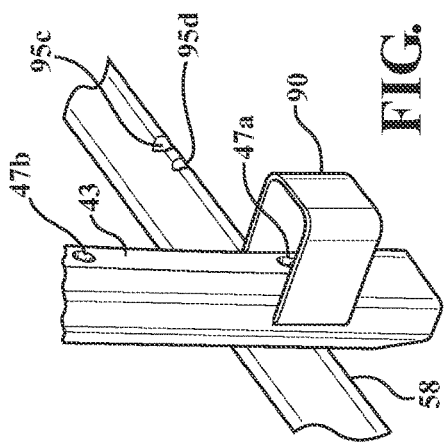
FIG. 5B is a partial, second perspective view of the first support assembly of FIG. 5A.

In some optional configurations, one or more cable management clips may be provided to route monitor cables. The clips are preferably u-shaped and made of a resilient plastic that flex relative to one another and which are suitable for snap-fit engagement. As shown in FIGS. 5A and 5B, cable management clip 90 may be snap-fit connected to the first vertical member 40 and/or second vertical member 46. As shown in FIG. 4B a cable management clip 91 may be snap fit to the first base member 38 and/or second base member 44. When in the free-standing configuration, the clip 91 is preferably provided on the portion of the first base member 38 that is behind the rear surface 24 of monitor 20 such that the rear surface 24 is between the clip 91 and the front surface 22 along the monitor thickness axis $m_t$.

Referring to FIGS. 8-14 a second embodiment of a television monitor assembly 120 is depicted. Unless otherwise indicated, the features of the second embodiment which correspond to those of the first embodiment have reference numerals that are 100 plus the reference numeral of the first embodiment's corresponding feature. Television monitor assembly 120 comprises a television monitor 121 that has a front surface 122 and a rear surface 124. Front surface 122 and rear surface 124 are spaced apart from one another along a monitor thickness axis $m_t$. Television monitor 121 also has a top surface 126 spaced apart from a bottom surface 128 along a monitor height axis $m_h$ and a width along a width axis $m_w$ that is perpendicular to the monitor height axis $m_h$ and the monitor thickness axis mt. Thus, the television monitor 121 will be described with reference to the same coordinate system $m_w$, $m_h$, $m_t$ used to describe the first embodiment.

Figure 8:
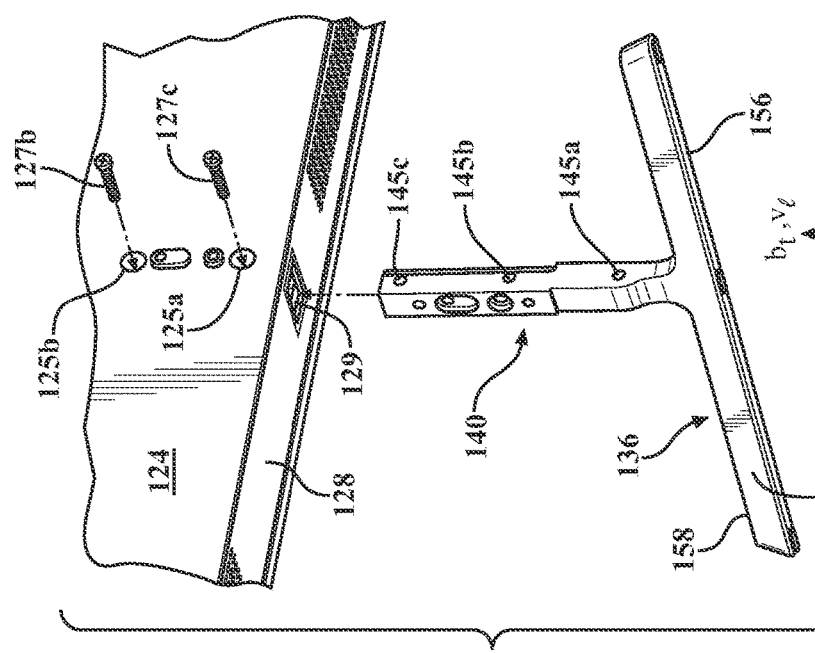
FIG. 8 is a front perspective view of a second embodiment of a television monitor assembly in a first free-standing configuration.

Television monitor assembly 120 includes support assembly 134 comprising first and second supports 136 and 142. Supports 136 and 142 may be attached to the television monitor 121 in multiple ways to create wall-mounted and free-standing configurations. In the example of FIG. 8, the television monitor assembly 120 is in a free-standing configuration. In certain examples, in addition to the monitor 121 and the supports 136, and 142, the television monitor assembly 120 includes, and preferably consists exclusively of, two support brackets and a plurality of fasteners (e.g., screws, bolts, anchors, rivets, etc.) to provide everything required to convert the assembly 120 to from one or more free-standing configurations to one or more wall-mounted configurations.

First support 136 includes a first base member 138 and a first vertical member 140, and second support 142 includes a corresponding second base member 144 and second vertical member 146 (FIG. 2). The first and second supports 136 and 142 will be described with reference to first support 136 as the two supports 136 and 142 have the same structure.

In a preferred example, and as shown in the figures, first support 136 is integrally formed to include first base member 138 and first vertical member 140 instead of using screws, bolts, or other fastening devices to mechanically connect the first base member 138 and the first vertical member 140. Thus, in contrast to the first embodiment, the first base member 138 and first vertical member 140 are not reconfigurable relative to one another, but rather, maintain the same spatial orientation relative to one another regardless of whether the television monitor assembly 120 is in a free-standing or wall-mounted configuration.

Figure 9A:
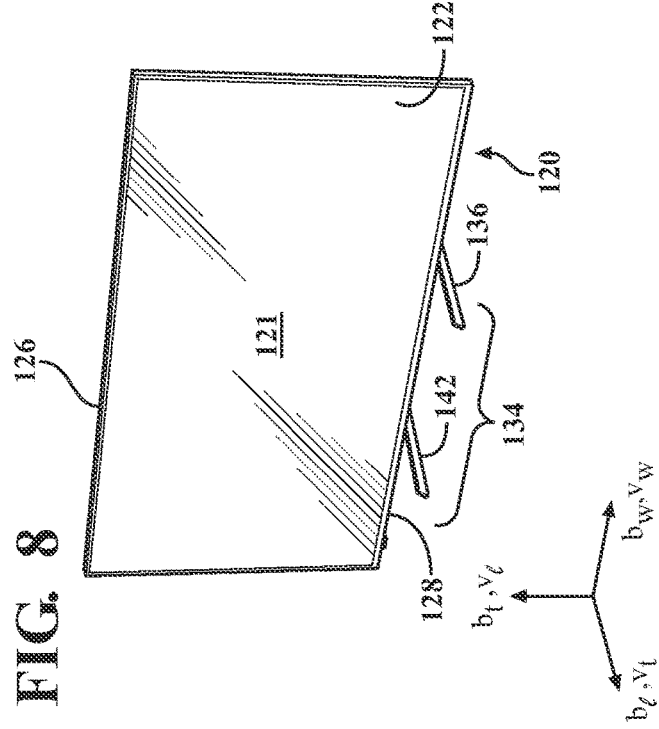
FIGS. 9A-9B are close-up views of a portion of the television monitor assembly of FIG. 8 showing the installation of a first support in an uninstalled and installed first free-standing configuration used when no soundbar is attached to the first support.
Figure 9B:
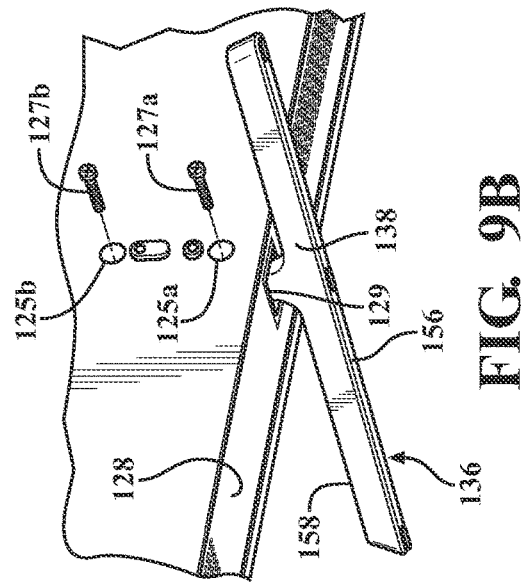

As shown in FIGS. 9A and 9B, in the free-standing configuration the first base member 138 length axis $b_l$ is perpendicular to the front surface 122 and rear surface 124 of the television monitor and to the monitor thickness axis $m_t$, and the first base member width axis $b_w$ is parallel to the monitor width axis $m_w$. The first base member thickness axis $b_t$ is parallel to the monitor height axis $m_h$ and the vertical member height axis $v_h$. The vertical member width axis $v_w$ is parallel to the monitor width axis $m_w$, and the vertical member thickness axis $v_t$ is parallel to the monitor thickness axis $m_t$. FIGS. 9A and 9B illustrate the attachment of first support 136 to monitor 121 in a first free-standing configuration. Television monitor 121 includes an opening 129 formed in the bottom surface 128 of monitor 121. A recess is provided in the interior of monitor 121 to receive first vertical member 140 when it is inserted into opening 129 in a direction along the monitor height axis $m_h$. In the first free-standing configuration the distance between the upper surface 158 of first base member 138 along the monitor height axis $m_h$ and the first vertical member length axis $v_l$ is reduced relative to a second configuration in which the distance is greater. Although an audio device such as soundbar 80 may be attached to the first and second base members 138 and 144 in the first free-standing configuration, the soundbar 80 would block a portion of the monitor front surface 122.

Fastener openings 145a-145c are provided on a rear surface of first vertical member 140. In the first free-standing configuration, the lower fastener openings 145a and 145b are aligned with corresponding openings 125a and 125b formed in the rear surface 124 of television monitor 121. Fasteners 127a and 127b (such as screws) are inserted through a respective one of television monitor rear surface openings 125a and 125b and into a respective one of first vertical member fastener openings 145a and 145b. In the first free-standing configuration, an audio device is not attached to the first and second supports 136 and 142. However, one could be attached. The spacing between the lower surface 128 of television monitor 121 and the base members 138 and 144 could cause the audio device to block a portion of the display. Television monitor 121 includes rear surface openings spaced apart from openings 125a and 125b along the monitor width axis $m_w$ for attaching the second vertical member 146 of second support 142 to monitor 121.

In the second free-standing configuration, the bottom surface 128 of television monitor 121 is spaced farther from upper surface 158 of first base member 138 than in the first free-standing configuration. In the second free-standing configuration, vertical member 140 attaches to monitor 121 in the same fashion as in the first free-standing configuration. However, instead of first vertical member fastener openings 145a and 145b, first vertical member fastener openings 145b and 145c are aligned with monitor rear surface openings 125a and 125b. Second support vertical member 146 is also attached to rear surface 124 of the monitor 121 as explained previously. In the second free-standing configuration an audio device such as sound bar 80 may be attached to the first base member 138 and a second base member 144 (FIG. 10) of second support 142 such as by providing through holes in the base members 138 and 144 which align with openings in the bottom of the sound bar 80 to receive fasteners for holding the soundbar 80 to the first base member 138 and second base member 144. The soundbar 80 bottom surface would rest on and abuttingly engage the respective upper surfaces 158 and 166 of first and second base members 138 and 144 (FIG. 10).

Figure 10:
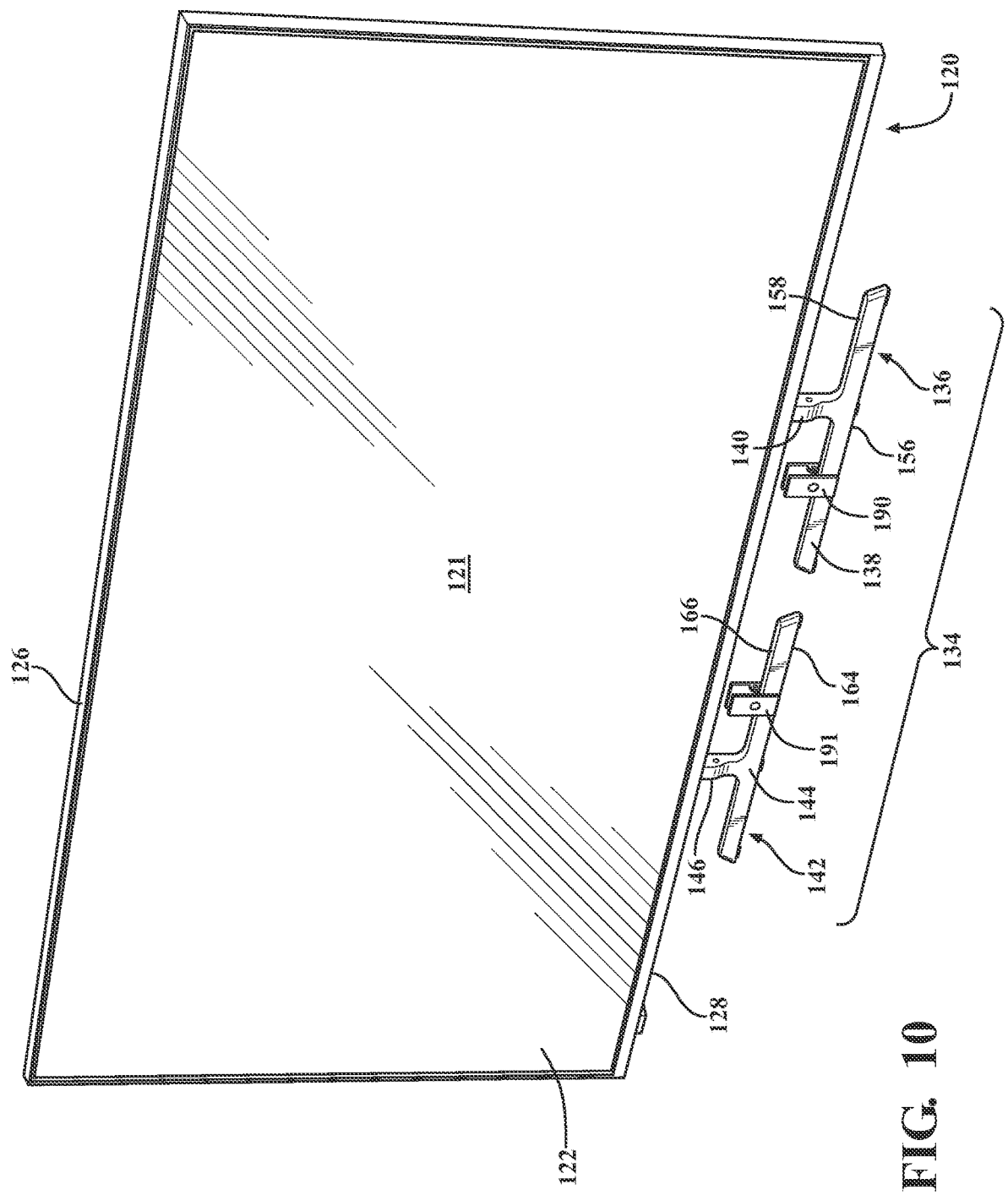
FIG. 10 is a front perspective view of the television monitor assembly of FIG. 8 in a first wall-mounted configuration prior to attachment of an audio device to the first and second supports.

Referring to FIG. 10, television monitor assembly 120 is shown in a wall-mounted configuration. In a wall-mounted configuration, supports 136 and 142 are attached to the television monitor 121 such that the length axis $b_l$ of the first and second base members 138 and 144 is parallel to the monitor width axis $m_w$. Cable management clips 190 and 191 are shown and are used to receive the various cables that connect the monitor 121 to external media devices such as DVD/Blu-Ray players and cable boxes.

FIG. 11A shows an audio visual system comprising television monitor assembly 120 in a first wall-mounted configuration with a sound bar 80 attached thereto. In the first wall-mounted configuration, front surface 83 of soundbar 80 is spaced apart from television monitor front surface 122 along the monitor thickness axis $m_t$ by a distance that is greater than in a second wall-mounted configuration described below. Referring to FIGS. 11B and 11C, in the first wall-mounted configuration, vertical member 140 is inserted into opening 129 in the bottom surface 128 of television monitor 121. Openings 147a and 147b in vertical member 140 are aligned with television monitor rear surface openings 125a and 125b to receive fasteners (e.g., screws) to secure the vertical member 140 to the television monitor 121. It is this positioning of the vertical member 140 relative to the television monitor 121 that positions the front surface 83 of audio device 80 farther from front surface 122 of television monitor 121 along the monitor thickness axis $m_t$ relative to the second wall-mounted configuration.

As shown in FIG. 11A, the audio visual system includes audio device support brackets, a first of which (support bracket 200) is shown. Support bracket 200 is L-shaped and comprises a support portion 204 and a connection portion 202.

Figure 14:
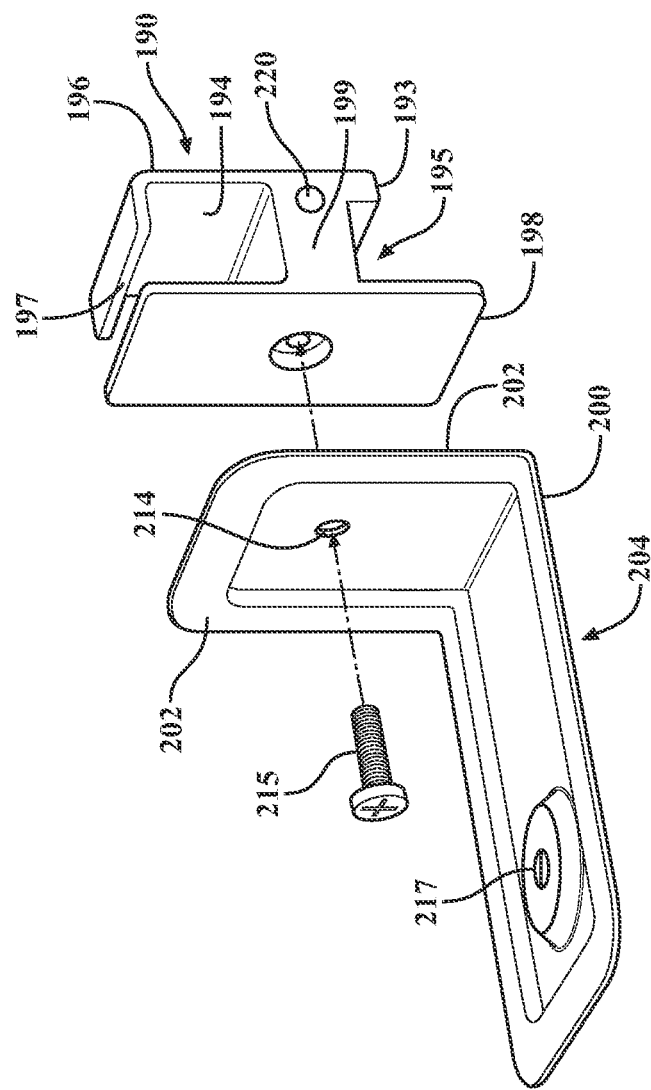
FIG. 14 is an exploded view of a cable clip and audio device-support bracket used to support an audio device when the television monitor assembly of FIG. 8 is in the first and second wall-mounted configurations.

Support bracket 200 is shown in more detail in FIG. 14. An opening is formed in the support portion 204 of the support bracket 200 and is aligned with a corresponding opening (not shown) in a bottom surface of soundbar 80 and receives a fastener (such as a screw) for connecting the soundbar 80 to the support bracket 200. Opening 214 in connection portion 202 receives fastener 215 and connects it to a support bracket engagement member 198 of cable management clip 190 via an opening (not separately labeled) in support bracket engagement member 198.

Referring to FIGS. 13A-C and 14, cable management clip 190 includes support bracket engagement member 198 and an L-shaped member 196 that is spaced apart rearwardly from the support bracket engagement member 198 along the first base member width axis $b_w$. An upper portion of the L-shaped member 196 and support bracket engagement member 198 define an upper opening 197 that is in communication with an upper recess 194.

L-shape member 196 has a lower surface 193 that is positioned beneath the upper surface 158 of first base member 138 when cable management clip 190 is in an installed condition on first base member 138 as shown in FIGS. 13A-13C. Cables can be inserted through the upper opening 197 for retention in recess 194. Middle horizontal portion 199 separates upper recess 194 from lower recess 195 that is sized to fit over the upper surface 158 of first base member 138. When installed on first base member 138, cable management clip 190 and support bracket 200 can be selectively repositioned along the first base member 138 length to a desired position for supporting soundbar 80.

Referring to FIGS. 11E and 13A-13C, a retention bracket 210 is provided which includes a C-shaped member 213 having an opening 212 and side brackets 216 and 218 (not shown). FIGS. 11D and 11E show the television monitor assembly 120 with the retention bracket omitted and as it is about to be installed. Retention bracket 210 is located rearward of the bracket 100 along the monitor thickness axis $m_w$, and the base member width axis $b_w$.

Side brackets 216 and 218 include respective openings 214 and 217 (not shown) which receive bosses 220 and 221 (not shown) formed on each side of the middle horizontal portion 199 of retention bracket 210. In addition, a reward protrusion 192 formed on cable management clip 190 is received by opening 212 in C-shaped member 213. The engagement of bosses 220, 221 and protrusion 192 with respective openings 214, 217 allows the retention bracket 210 to snap-fittingly engage cable management clip 190. The C-shaped member 213 extends over the top of cable management clip 190 and under the bottom of base member 138 to better ensure that the weight and dimensions of the soundbar do not cause the cable management clip 190 to come off the first base member 138.

In the example of FIG. 10, one cable management clip 190 and 191 is shown for each base member 138 and 144, and one audio device support bracket such bracket 100 would be connected to each of them. However, additional support brackets and cable management clips may be provided on either or both base members 138 and 144.

Figure 12B:
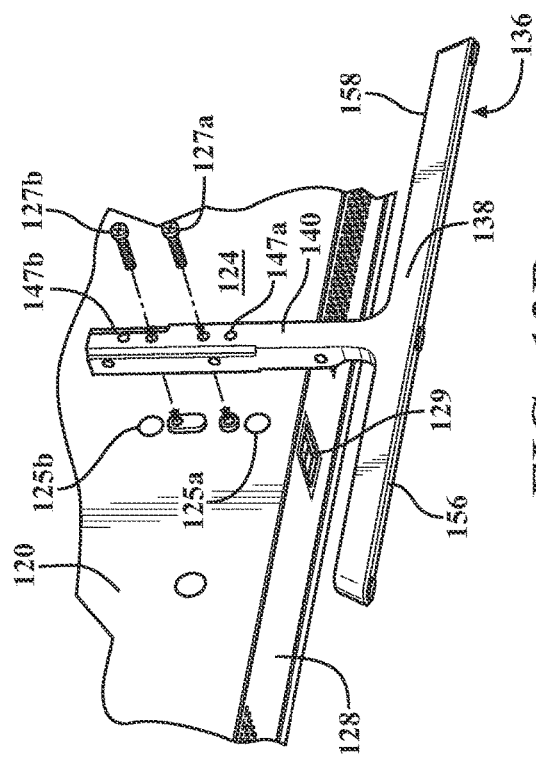
FIGS. 12B-12C are close-up views of the rear of the television monitor assembly of FIG. 8 showing the installation of a first support in the second wall-mounted configuration.
Figure 12C:
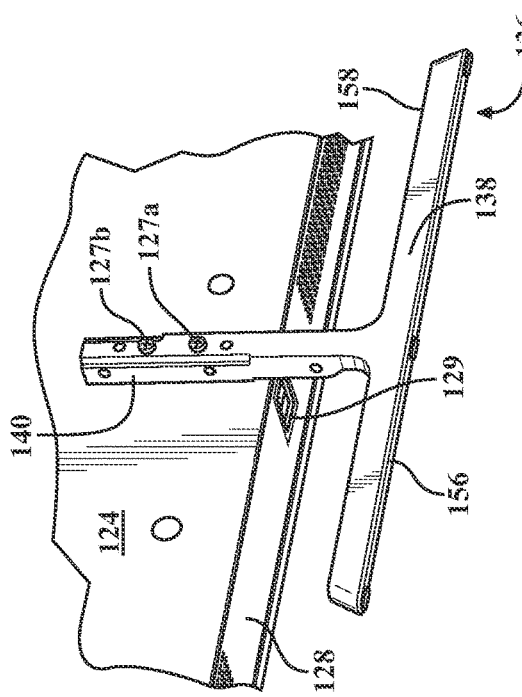
Figure 12A:
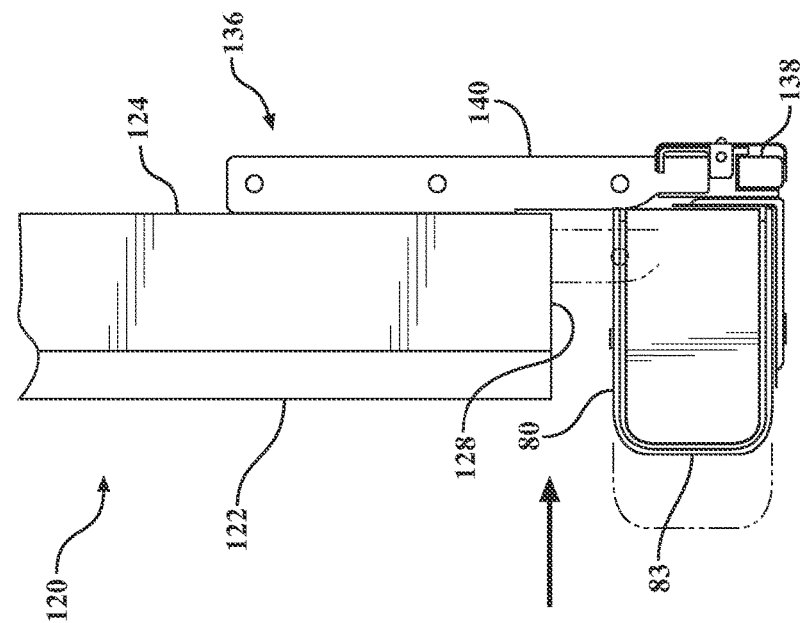
FIG. 12A is a side elevation view of the television monitor assembly of FIG. 8 in a second wall-mounted configuration with an attached audio device in which the audio device is recessed further toward the rear of the television monitor relative to the first wall-mounted configuration.

Referring to FIGS. 12A-12C television monitor assembly 120 is shown in a second wall-mounted configuration. In the second wall-mounted configuration, the support bracket 100, cable management clip 190, and retention bracket 210 are attached to first base member 138 in the same fashion as in the first wall-mounted configuration, as are any counterparts thereof attached to second base member 144. However, instead of inserting the vertical member 140 into television monitor bottom surface opening 129, it is attached to the outside of the rear surface 124 and externally to television monitor 121. Openings formed through the surface of vertical member 140 opposite the surface through which openings 147a and 147b are formed are aligned with openings 125a and 125b to receive fasteners 127a and 127b. Securing vertical member 140 to the rear surface 124 of television monitor 121 causes the front surface 83 of sound bar 80 to be located closer to the front surface 122 of television monitor 121 in a direction along the monitor thickness axis $m_w$. As with the previous embodiments, it is understood that second support 142 would connect to the rear surface 124 of television monitor 121 in a similar fashion.

A method of using the television monitor assembly 120 of FIG. 8 will now be described. In accordance with the method, the television monitor assembly 120 is provided in the free-standing configuration of FIG. 8, and it is desired to mount the television monitor assembly on a wall. If the television monitor assembly 120 is in the second free-standing configuration with a soundbar attached to base members 138 and 144, the soundbar is removed from the base members.

The first support 136 is removed from television monitor 121 by removing fasteners 127 and 127b from rear surface 124 of television monitor 121, and sliding the vertical member 140 out of the internal recess (not shown) in the television monitor 121. The second support 142 is removed in a similar fashion. Support bracket 200 is attached to cable management clip 190 by inserting fastener 215 through support bracket opening 214 and into a corresponding opening in support bracket engagement member 198 of cable management clip 190. A second corresponding support bracket (not shown) is attached to a corresponding cable management clip in a similar fashion. Soundbar 80 is attached to support bracket 200 by inserting a fastener through opening 217 and into a corresponding opening in a bottom surface of soundbar 80, and the second corresponding support bracket is attached to the soundbar 80 in a similar fashion.

First support 136 is rotated 90 degrees (when viewed along the vertical member 140 length axis $v_l$) such that the first base member 138 length axis $b_l$ is parallel to the monitor width axis $m_w$, and the vertical member 140 is reinserted in opening 129 in bottom surface 128 of television monitor 121 and into the internal recess therein. Fasteners 127a and 127b are inserted through openings 125a and 125b in rear surface 124 of television monitor 121 and into openings 147a and 147b in vertical member 140. Second support 142 is installed in the same fashion at a location spaced apart from opening 129 along the monitor width axis $m_w$.

The sound bar 80 with the assembled support bracket 200 and cable management clip 190 is attached to the first base member 138 by snap fitting the first base member 138 into recess 195 on cable management clip 190. The soundbar 80 is attached to the second base member 144 in a similar fashion. Retention bracket 213 is attached to cable management clip 190 as shown in FIGS. 13B and 13C by snap fitting side bracket opening 214 over bosses 220 such that bosses 220 projects through opening 214, and a counterpart side bracket 218 (not shown) is attached to the opposite side of the cable management clip 190 in a similar fashion as both sides of middle horizontal portion 199 have protrusions like bosses 220. Opening 212 in C-shaped member 213 is snap-fit over protrusion 192 on cable management clip L-shaped member 196. A counterpart retention bracket (not shown) is attached to the counterpart cable management clip (not shown) attached to second base member 144. The audio visual system comprising the television monitor assembly 120 and sound bar 80 is then attached to a wall using a known connection apparatus such as a VESA wall mount. If the second wall-mounted configuration is desired, vertical member 140 would be attached to the rear surface 124 of television monitor 121 as shown in FIGS. 12B and 12C. The method may be reversed to place television monitor assembly 120 in a free-standing configuration.

What is claimed is:

1. A television monitor assembly, comprising:
   a television monitor having a height defining a monitor height axis and a width defining a monitor width axis, the television monitor further comprising a front surface and a rear surface spaced apart along a monitor thickness axis;
   a first pair of support members, comprising a first base member and a first vertical member, the first base member having a first base member length defining a first base member length axis, a first base member width defining a first base member width axis, and a first base member thickness defining a first base member thickness axis, wherein the first base member length is greater than the first base member width and the first base member thickness;
   a second pair of support members comprising a second base member and a second vertical member, the second base member having a second base member length defining a second base member length axis, a second base member width defining a second member width axis, and a second base member thickness defining a second base member thickness axis, wherein the second base member length is greater than the second base member width and the second base member thickness; and a soundbar;

wherein the television monitor assembly has (i) a free-standing configuration in which the first vertical member and the second vertical member are attached to the rear surface of the television monitor such that the length axis of the first vertical member is substantially parallel to the monitor height axis, the second vertical member length axis is substantially parallel to monitor height axis, the first vertical member is spaced apart from the second vertical member along the monitor width axis, the first base member is attached to the first vertical member such that the first base member length axis is substantially perpendicular to the front surface of the monitor, the second base member is attached to the second vertical member such that the length of the second base member length axis is perpendicular to the front surface of the monitor, and the soundbar is selectively attachable to the upper surface of the first base member and the upper surface of the second base member, and (ii) a wall-mountable configuration, in which the first vertical member and the second vertical member are attached to the rear surface of the television monitor such that the first vertical member length axis is substantially parallel to the monitor height axis, the second vertical member length axis is substantially parallel to the monitor height axis, the first vertical member is spaced apart from the second vertical member along the monitor width axis; and the soundbar is selectively attachable to the bottom surface of the first base member and the bottom surface of the second base member.

2. The television monitor assembly of claim 1, wherein in the wall-mountable configuration, the first base member is attached to the first vertical member such that the first base member length axis is substantially parallel to the monitor width axis, and the second base member is attached to the second vertical member such that the second base member length axis is substantially parallel to the monitor width axis.

3. The television monitor assembly of claim 1, wherein the first base member has a bottom surface, an upper surface spaced apart from the bottom surface along the first base member thickness axis, and two side surfaces spaced apart from one another along the first base member width axis, each of the two side surfaces sloping toward the other of the two side surfaces when moving in a direction from the first base member bottom surface to the first base member upper surface.

4. The television monitor assembly of claim 1, wherein the first vertical member has a first end and a second end spaced apart from the first end along the first vertical member length axis, and the second end has a recessed portion.

5. The television monitor assembly of claim 4, wherein in the free-standing configuration, the recessed portion of the first vertical member abuttingly engages the first base member.

6. The television monitor assembly of claim 5, wherein the second vertical member has a first end and a second end spaced apart from the first end along the first vertical member length axis, and the second end has a recessed portion, and wherein in the free-standing configuration, the recessed portion of the second vertical member abuttingly engages the second base member.

7. The television monitor assembly of claim 1, wherein in the free-standing configuration and the wall-mountable configuration, the first vertical member has first and second attachment surfaces spaced apart from one another along the monitor thickness axis, and in the wall-mountable configuration, the first attachment surface of the first vertical member is attached to the upper surface of the first base member such that the first base member bottom surface is substantially parallel to the monitor height axis.

8. The television monitor assembly of claim 7, wherein in the free-standing configuration and the wall-mountable configuration, the second vertical member has first and second attachment surfaces spaced apart from one another along the monitor thickness axis, and in the wall-mountable configuration, the first attachment surface of the second vertical member is attached to the upper surface of the second base member such that the second base member bottom surface is substantially parallel to the monitor height axis.

9. The television monitor assembly of claim 1, further comprising a plurality of external device support brackets, wherein when the television monitor assembly is in the wall-mountable configuration, the brackets are selectively attachable to a selected one of the first base member and the second base member and project away from the selected one of the first base member and the second base member along the monitor thickness axis.

10. A television monitor assembly, comprising:
a television monitor,
a first base member,
a second base member,
a first vertical member,
a second vertical member, and
a soundbar,
wherein the television monitor assembly has
(i) a free-standing configuration in which the first base member is attached to the first vertical member to define a first spatial orientation between the first base member and the first vertical member and a first spatial orientation between the first base member and the television monitor, the second base member is attached to the second vertical member to define a first spatial orientation between the second base member and the second vertical member and a first spatial orientation between the second base member and the television monitor, and
(ii) a wall-mountable configuration in which the first base member is attached to the first vertical member to define a second spatial orientation between the first base member and the first vertical member and a second spatial orientation between the first base member and the television monitor, and in which the second base member is attached to the second vertical member to define a second spatial orientation between the second base member and the second vertical member and a second spatial orientation between the second base member and the television monitor, wherein in the free-standing configuration and the wall-mountable configuration, the soundbar is attached to at least one of the first base member and the second base member.

11. An audio-visual system comprising:
the television monitor assembly of claim 10;
wherein the television monitor assembly comprises the television monitor, the soundbar, and support hardware, and the support hardware consists of the first base member, the second base member, the first vertical member, the second vertical member, at least one bracket, and a plurality of fasteners.

12. An audio-visual system comprising:
the television monitor assembly of claim 10;

wherein in the free-standing configuration, the soundbar is attached to the first base member and the second base member to define a first spatial orientation between the soundbar and the first base member and a first spatial orientation between the soundbar and the second base member, and in the wall-mountable configuration, the soundbar is attached to the first base member and the second base member to define a second spatial orientation between the soundbar and the first base member and a second spatial orientation between the soundbar and the second base member.

13. The audiovisual system of claim 10, wherein the television monitor has a monitor height axis and a monitor width axis, in the free-standing configuration, the soundbar is spaced apart from the television monitor along the monitor height axis, and in the wall-mountable configuration, the soundbar is spaced apart from the television monitor along the monitor height axis.

14. The television monitor assembly claim 10, wherein the first base member has a length defining a first base member length axis, a thickness defining a first base member thickness axis, a width defining a first base member width axis, a first member bottom surface spaced apart from a first member upper surface along the thickness axis, and in the first spatial orientation between the first base member and the first vertical member, the first base member bottom surface is substantially perpendicular to the first vertical member length axis, and in the second spatial orientation between the first base member and the first vertical member, the first base member bottom surface is substantially parallel to the first vertical member length axis.

15. The audiovisual system of claim 10, wherein the television monitor has a height defining a monitor height axis and a width defining a monitor width axis, the first base member has a length defining a first base member length axis, a width defining a first base member width axis, and a thickness defining a first base member thickness axis, and in the first spatial orientation between the first base member and the television monitor, the first base member length axis is substantially perpendicular to the monitor width axis, and in the second spatial orientation between the first base member and the television monitor, the first base member length axis is substantially parallel to the monitor width axis.

16. An audiovisual system, comprising:
the television monitor assembly of claim 10;
wherein the soundbar has a length defining a soundbar length axis and at least one speaker, the at least one speaker having a median axis,
wherein in the free-standing configuration, the soundbar length axis is substantially perpendicular to the first base member length axis and second base member length axis, the at least one speaker median axis is substantially parallel to the first base member length axis and the second base member length axis, and
in the wall-mountable configuration, the soundbar length axis is substantially parallel to the first base member length axis.

17. A method of mounting a free-standing television monitor assembly on a wall,
wherein the free-standing television monitor assembly comprises:
a television monitor having a front surface and a rear surface,
a first vertical member attached to the rear surface of the television monitor,
and a second vertical member attached to the rear surface of the television monitor, and
a soundbar,
wherein:
the first vertical member has a first vertical member first end and a first vertical member second end spaced apart along a first vertical member length axis, the second vertical member has a second vertical member first end and a second vertical member second end spaced apart along a second vertical member length axis, the first vertical member second end is spaced apart from the television monitor along the first vertical member length axis, and the second vertical member second end is spaced apart from the television monitor along the second vertical member length axis, the first vertical member second end is attached to a first base member,
the first base member having a first base member length defining a first base member length axis, the second vertical member second end is attached to a second base member having a second base member length defining a second base member length axis, wherein the first base member length axis is substantially perpendicular to the television monitor front surface, and the second base member length axis is substantially perpendicular to the television monitor front surface, the soundbar has a soundbar length defining a length axis, a soundbar height defining a height axis, and a soundbar thickness defining a thickness axis, and the soundbar length is greater than the soundbar height and the soundbar thickness;
the method comprising:
detaching the first base member from the first vertical member; detaching the second base member from the second vertical member;
attaching the first base member to the first vertical member such that the first base member length axis is substantially parallel to the television monitor front surface;
attaching the second base member to the second vertical member such that the second base member length axis is substantially parallel to the television monitor front surface;
attaching the rear surface of the television monitor to the wall; and
attaching the soundbar to the first base member and the second base member.

18. The method of claim 17, further comprising:
wherein the step of attaching the soundbar to the first base member and the second base member comprises attaching the soundbar to the first base member and the second base member such that the soundbar length axis is substantially parallel to the first base member length axis and the second base member length axis.

19. The method of claim 18, wherein the step of attaching the soundbar to the first base member and the second base member comprises:
providing at least two brackets, each having a connection portion and a support portion;
attaching the connection portion of a first of the two brackets to the first base member and the connection portion of the second of the two brackets to the second base member such that the support portion of the first bracket projects away from the first base member in a direction substantially perpendicular to the television monitor front surface, and the support portion of the second bracket projects away from the second base member in a direction substantially perpendicular to the television monitor front surface; and positioning the soundbar on top of the support surfaces of the first and second brackets.

20. A television monitor assembly, comprising:
a television monitor having a height defining a monitor height axis and a width defining a monitor width axis, the television monitor further comprising a front surface and a rear surface spaced apart along a monitor thickness axis;
a first support comprising a first base member and a first vertical member, the first base member having a first base member length defining a first base member length axis, a first base member width defining a first base member width axis, and a first base member thickness defining a first base member thickness axis, wherein the first base member length is greater than the first base member width and the first base member thickness;
a second support comprising a second base member and a second vertical member, the second base member having a second base member length defining a second base member length axis, a second base member width defining a second base member width axis, and a second base member thickness defining a second base member thickness axis, wherein the second base member length is greater than the second base member width and the second base member thickness; and
an audio device;
wherein the television monitor assembly has
(i) a free-standing configuration in which the first support is attached to the television monitor such that the first base member length axis and the second base member length axis are substantially perpendicular to the monitor width axis; and
(ii) a wall-mounted configuration in which the second support is attached to the television monitor such that the first base member length axis and the second base member length axis are substantially parallel to the monitor width axis;
wherein in at least the wall-mounted configuration the audio device is attached to the first and second base members.

21. The television monitor assembly of claim 20, wherein the first support comprises a first support assembly, and the second support comprises a second support assembly.

22. The television monitor assembly of claim 20, wherein the first support is an integrally formed first support comprising the first base member and the first vertical member, and the second support is an integrally formed second support comprising the second base member and the second vertical member.

23. The television monitor assembly of claim 20, wherein the television monitor comprises a bottom surface having a first and second openings spaced apart along the monitor width axis, and wherein the first and second openings are sized to receive the first and second vertical members, respectively.

24. The television monitor of claim 23, wherein the television monitor assembly has a first wall-mounted configuration in which the first vertical member is inserted in the first opening in the bottom surface of the television monitor and the second vertical member is inserted in the second opening in the second opening in the bottom surface of the television monitor.

25. The television monitor assembly of claim 24, wherein the television monitor assembly has a second wall-mounted configuration in which the first and second vertical members are attached to the rear surface of the television monitor and externally to the television monitor.

26. The television monitor assembly of claim 23, wherein the television monitor assembly has a first free-standing configuration in which the first vertical member is inserted into the first opening in the bottom surface of the television monitor, and the second vertical member is inserted into the second opening in the bottom surface of the television monitor.

27. The television monitor assembly of claim 26, wherein the television monitor assembly has a second free-standing configuration in which the first and second vertical members are attached to the rear surface of the television monitor and externally to the television monitor.

* * * * *